(12) United States Patent
Inoue et al.

(10) Patent No.: US 12,041,593 B2
(45) Date of Patent: *Jul. 16, 2024

(54) WIRELESS COMMUNICATION SYSTEM, WIRELESS COMMUNICATION SETTING METHOD, BASE STATION, MOBILE STATION, AND PROGRAM

(71) Applicant: NEC Corporation, Tokyo (JP)

(72) Inventors: Takamichi Inoue, Tokyo (JP); Kenji Koyanagi, Tokyo (JP); Le Liu, Tokyo (JP); Yoshikazu Kakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,899

(22) Filed: Jan. 24, 2023

(65) Prior Publication Data
US 2023/0171754 A1 Jun. 1, 2023

Related U.S. Application Data

(63) Continuation of application No. 17/071,648, filed on Oct. 15, 2020, now Pat. No. 11,601,939, which is a
(Continued)

(30) Foreign Application Priority Data

Mar. 19, 2008 (JP) .................................. 2008-072581

(51) Int. Cl.
*H04W 72/0453* (2023.01)
*H04L 5/00* (2006.01)
(Continued)

(52) U.S. Cl.
CPC ....... *H04W 72/0453* (2013.01); *H04L 5/0007* (2013.01); *H04L 5/0037* (2013.01);
(Continued)

(58) Field of Classification Search
CPC . H04W 72/0453; H04W 72/20; H04W 72/21; H04W 72/23; H04W 88/02;
(Continued)

(56) References Cited

U.S. PATENT DOCUMENTS 8,767,646 B2 7/2014 Han .................... H04B 7/0689
370/329
8,953,551 B2 2/2015 Inoue
(Continued)

FOREIGN PATENT DOCUMENTS

CN 1808951 A 7/2006
CN 101043495 A 9/2007
(Continued)

OTHER PUBLICATIONS

Huawei, "Sequence Allocation Method for E-UTRA Uplink Reference Signal," 3GPP TSG RAN WG1 meeting #47bis, R1-070367, Jan. 15-19, 2007, All pages (total 3 pages).
(Continued)

*Primary Examiner* — Ayaz R Sheikh
*Assistant Examiner* — Tarell A Hampton
(74) *Attorney, Agent, or Firm* — Sughrue Mion, PLLC

(57) ABSTRACT

A base station includes a transmitter configured to transmit a downlink control information to a user equipment, the downlink control information being generated based on one of (1) a first uplink allocation information indicating a first frequency block corresponding to a first plurality of subcarriers which are contiguous in frequency and (2) a second uplink allocation information indicating a second frequency block corresponding to a second plurality of subcarriers which are contiguous in frequency and a third frequency block corresponding to a third plurality of subcarriers which are contiguous in frequency, the second frequency block and the third frequency block being separated in frequency.

18 Claims, 19 Drawing Sheets

Related U.S. Application Data continuation of application No. 16/149,362, filed on Oct. 2, 2018, now Pat. No. 10,849,126, which is a continuation of application No. 15/651,341, filed on Jul. 17, 2017, now Pat. No. 10,117,250, which is a continuation of application No. 15/282,856, filed on Sep. 30, 2016, now Pat. No. 9,743,410, which is a continuation of application No. 15/008,090, filed on Jan. 27, 2016, now Pat. No. 9,474,074, which is a continuation of application No. 14/669,932, filed on Mar. 26, 2015, now Pat. No. 9,277,545, which is a continuation of application No. 13/551,296, filed on Jul. 17, 2012, now Pat. No. 9,031,034, which is a continuation of application No. 12/735,993, filed as application No. PCT/JP2009/055259 on Mar. 18, 2009, now Pat. No. 8,953,551.

(51) Int. Cl.
| | | |
|---|---|---|
| *H04L 27/26* | (2006.01) | |
| *H04W 72/20* | (2023.01) | |
| *H04W 72/21* | (2023.01) | |
| *H04W 72/23* | (2023.01) | |
| *H04W 88/02* | (2009.01) | |
| *H04W 88/08* | (2009.01) | |

(52) U.S. Cl.
CPC .......... *H04L 5/0041* (2013.01); *H04L 5/0044* (2013.01); *H04L 5/0048* (2013.01); *H04L 5/0057* (2013.01); *H04L 5/006* (2013.01); *H04L 5/0064* (2013.01); *H04L 5/0094* (2013.01); *H04L 27/2614* (2013.01); *H04W 72/20* (2023.01); *H04W 72/21* (2023.01); *H04W 72/23* (2023.01); *H05K 999/99* (2013.01); *H04W 88/02* (2013.01); *H04W 88/08* (2013.01)

(58) Field of Classification Search
CPC ... H04W 88/08; H04W 72/542; H04W 72/54; H04L 5/0007; H04L 5/0037; H04L 5/0041; H04L 5/0044; H04L 5/0048; H04L 5/0057; H04L 5/006; H04L 5/0064; H04L 5/0094; H04L 27/2614; H05K 999/99
See application file for complete search history.

(56) References Cited

U.S. PATENT DOCUMENTS

| | | |
|---|---|---|
| 2001/0024427 A1 | 9/2001 | Suzuki |
| 2002/0071480 A1 | 6/2002 | Marjelund et al. |
| 2004/0131007 A1 | 7/2004 | Smee et al. |
| 2006/0203932 A1 | 9/2006 | Palanki et al. |
| 2006/0251041 A1 | 11/2006 | Pajukoski et al. |
| 2006/0264217 A1 | 11/2006 | Shaheen .............. H04W 8/24 455/445 |
| 2007/0004465 A1 | 1/2007 | Papasakellariou et al. |
| 2007/0041404 A1 | 2/2007 | Palanki et al. |
| 2007/0115795 A1 | 5/2007 | Gore et al. |
| 2007/0183366 A1 | 8/2007 | Muharenovic et al. |
| 2007/0274288 A1 | 11/2007 | Smith et al. |
| 2008/0039098 A1 | 2/2008 | Papasakellariou et al. |
| 2008/0043708 A1 | 2/2008 | Muharemovic et al. |
| 2008/0043711 A1 | 2/2008 | Hart et al. |
| 2008/0049586 A1 | 2/2008 | Kakura et al. |
| 2008/0089431 A1 | 4/2008 | Van De Beek et al. |
| 2008/0095252 A1 | 4/2008 | Kim et al. |
| 2008/0117867 A1 | 5/2008 | Yin et al. |
| 2008/0123516 A1 | 5/2008 | Lee |
| 2008/0232449 A1 | 9/2008 | Khan et al. |
| 2008/0260059 A1 | 10/2008 | Pan |
| 2008/0298433 A1 | 12/2008 | Tiirola et al. |
| 2008/0298477 A1 | 12/2008 | Classon |
| 2009/0059835 A1 | 3/2009 | Motegi ................. H04L 12/189 370/312 |
| 2009/0080569 A1 | 3/2009 | Han et al. |
| 2009/0110087 A1 | 4/2009 | Liu et al. |
| 2009/0231993 A1 | 9/2009 | Zhang et al. |
| 2009/0238241 A1 | 9/2009 | Hooli et al. |
| 2009/0268695 A1 | 10/2009 | Zhao ................... H04L 25/0235 370/336 |
| 2009/0285327 A1 | 11/2009 | Iwai et al. |
| 2009/0325585 A1 | 12/2009 | Farajidana ............ H04W 72/14 455/450 |
| 2010/0002804 A1 | 1/2010 | Ogawa et al. |
| 2010/0014467 A1 | 1/2010 | Wang et al. |
| 2010/0027481 A1 | 2/2010 | Lindh et al. |
| 2010/0046356 A1 | 2/2010 | Chun et al. |
| 2010/0061285 A1 | 3/2010 | Maeda |
| 2010/0061302 A1 | 3/2010 | Ishii et al. |
| 2010/0098020 A1 | 4/2010 | Kim et al. |
| 2011/0002282 A1 | 1/2011 | Inoue |
| 2011/0165834 A1 | 7/2011 | Hart et al. |
| 2011/0319119 A1 | 12/2011 | Ishii |

FOREIGN PATENT DOCUMENTS

| | | |
|---|---|---|
| CN | 101064963 A | 10/2007 |
| KR | 2007-0082560 A | 8/2007 |
| KR | 10-2008-0016508 A | 2/2008 |
| WO | 2007000095 A1 | 1/2007 |
| WO | 2007007350 A1 | 1/2007 |
| WO | 2007/094628 A1 | 8/2007 |
| WO | 2007/133411 A2 | 11/2007 |
| WO | 2007122828 A1 | 11/2007 |
| WO | 2007/148796 A1 | 12/2007 |
| WO | 2008/081313 A2 | 7/2008 |
| WO | 2008/082263 A2 | 7/2008 |
| WO | 2008/084622 A1 | 7/2008 |
| WO | 2008/093716 A1 | 8/2008 |
| WO | 2008/094022 | 8/2008 |
| WO | 2009/020358 A1 | 2/2009 |

OTHER PUBLICATIONS

"Signaling Resource Allocations in DL Control Channel", 3GPP TSG-Ran WG1 Meeting #60bis, Alcatel-Lucent, Oct. 8-12, 2007.
Korean Office Action dated Aug. 27, 2012, with Concise Explantion of Relevance.
"Uplink Resource Allocation for E-UTRA", NEC Group, NTT DoCoMo, TSG-RAN WG 1#48, Feb. 12-16, 2007.
"DL LVRB Allocation Approach 2", 3GPP R1-074206, LG Electronics, Oct. 2007.
Office Action dated Dec. 11, 2019 in U.S. Appl. No. 16/276,404.
Approved Report of 3GPP TSG RAN WG1 #47bis, v2.0.0 (Sorrento, Italy Jan. 15-19, 2007) R1-071245, 119 pages in English.
Texas Instruments, "Uplink Reference Signal Design in EUTRA", 3GPP TSG RAN WG1#46bis, R1-062642, Oct. 9-13, 2006, All pages (total 10 pages).
Counterpart US Office Action dated May 29, 2019 in corresponding U.S. Appl. No. 16/276,404 (Q244992).
Communication dated Jun. 2, 2017 from the State Intellecutal Property Office of the P.R.C., in counterpart Chinese application No. 201410837268.0.
Communication dated Jan. 7, 2013 from the State Intellecutal Property Office of the People's Republic of China in application No. 200980107180.0.
Extended European Search Report dated Jan. 3, 2013.
"Scheduling Policy and Signaling Way on DL Resource Allocation", 3GPP R1-072723, Mitsubishi Alcatel-Lucent, Oct. 6-12, 2007.
"Signaling Resource Allocation in DL Control Channel", Oct. 2007, http://ftp.3gpp.org/tsg_ran/WG1_R1/TSGR1_50b/Docs/R1-074259.
NTT Docomo et al., "Channel-Dependent Scheduling for E-UTRA Uplink", 3GPP TSG-RAN WG1 Meeting #44, R1-060323, Feb. 13-17, 2006, pp. 1-11 (total 11 pages).

(56) References Cited

OTHER PUBLICATIONS

NTT DoCoMo et al., "Reference Signal Sequence Allocation Method in E-UTRA Uplink", 3GPP TSG RAN WG1 Meeting #46bis, R1-062728, Oct. 9-13, 2006, pp. 1-7 (total 7 pages).
Communication dated Dec. 18, 2012 from the United States Patent and Trademark Office in U.S. Appl. No. 12/735,993.
NTT DoCoMo, Uplink Multiple Access Scheme for Evolved Ultra, 3GPP TSG RAN WG1 Meeting #40bis R1-050248, Apr. 2005, pp. 1-7.
"Reference Signal Sequence Allocations Method in E-UTRA Uplink", 3GPP TSG-RAN WG 1 Meeting #47, NTT DoCoMo, LG Electronics, Mitsubishi Electric, Panasonic Sharp, Toshiba Corporation, Nov. 6-10, 2005.
Korean Office Action dated Jul. 25, 2011, with Japanese and partial English translation.
U.S. Office Action dated Sep. 6, 2013 in U.S. Appl. No. 12/735,993.
Counterpart Japanese Office Action with English machine translation dated Oct. 7, 2020 in corresponding Japanese Application 2019-152404.
Motorola, "EUTRA SC-FDMA Uplink Resource Block, Resource Allocation and Pilot/Reference Signal Design & TP", 3GPP TSG RAN1 LTE Ad Hoc. R1-060246, Jan. 23-25, 2006, pp. 1-18 (total 18 pages).
Communication dated Feb. 16, 2015 from the Japanese Patent Office in application No. 2014-103179.
U.S. Office Action dated Jun. 16, 2014 in U.S. Appl. No. 12/735,993.
"UE Identity in L1/L2 Downlink Control Signaling", 3GPP TSG-RAN WG 1#45, Sharp, May 8-12, 2006.
Keigo Mashima, et al., "A study on Broadband Single Carrier Transmission Technique Using Dynamic Spectrum Control", Technical Report of IEICE, RCS2006-233, Jan. 2007.
Resource Allocation and Indication for LTE R1-073416, Aug. 20-24, 2007, 4 pages in English.

FIG. 5

| CELL SIZE | MAXIMUM FREQUENCY BLOCK COUNT |
|---|---|
| 1 | 4 |
| 2 | 2 |
| 3 | 1 |

FIG. 6

| SYSTEM BANDWIDTH (MHz) | MAXIMUM FREQUENCY BLOCK COUNT |
|---|---|
| 50 | 4 |
| 10 | 2 |
| 1.25 | 1 |

FIG. 10

| CQI LEVEL | MAXIMUM FREQUENCY BLOCK COUNT |
|---|---|
| 31-21 | 4 |
| 20-10 | 2 |
| 9-0 | 1 |

FIG. 11

| MOBILE STATION CLASS | MAXIMUM FREQUENCY BLOCK COUNT |
|---|---|
| 3 | 4 |
| 2 | 2 |
| 1 | 1 |

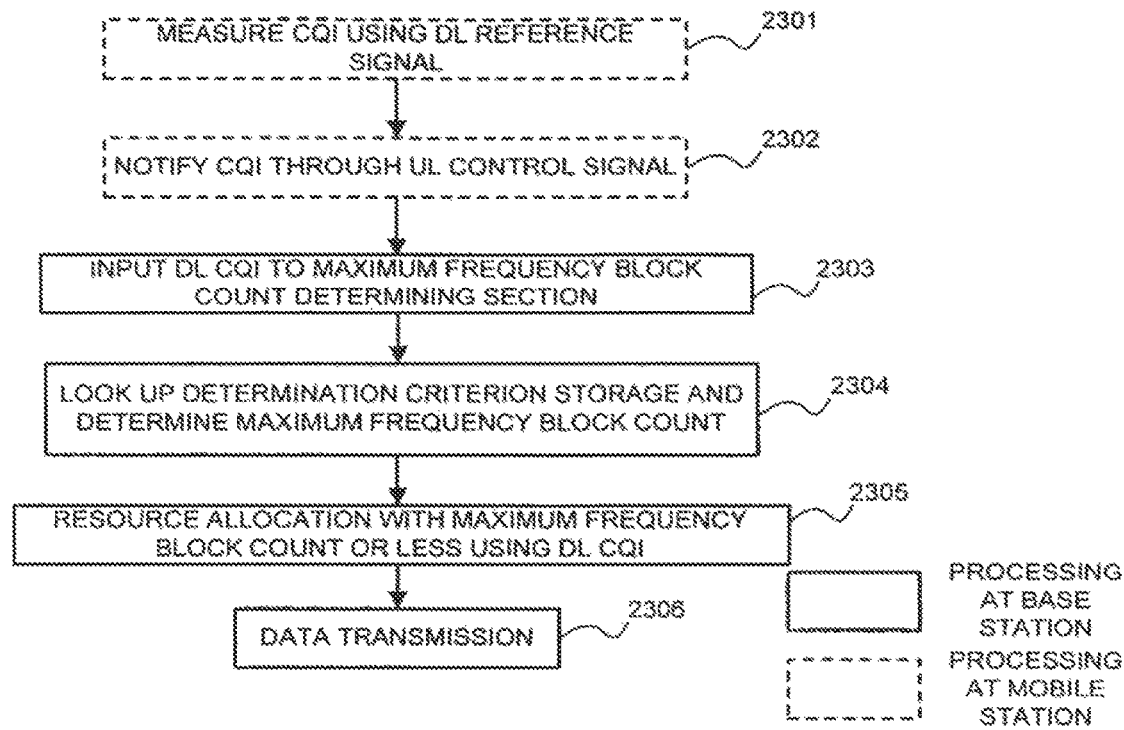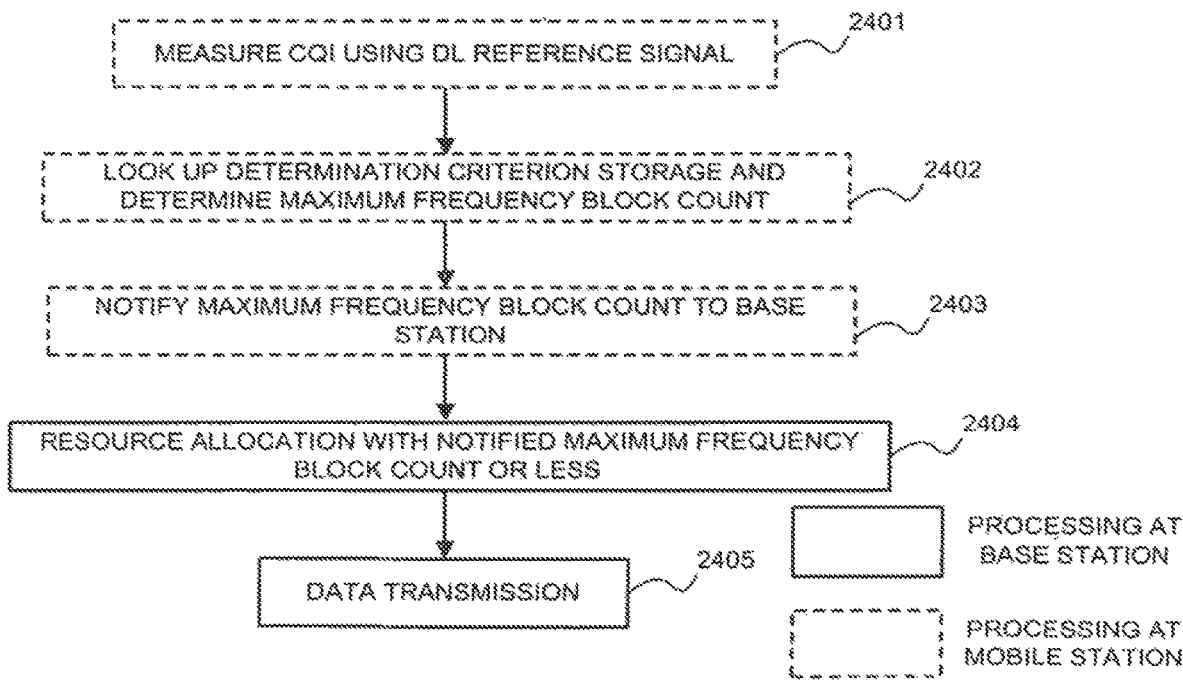

WIRELESS COMMUNICATION SYSTEM, WIRELESS COMMUNICATION SETTING METHOD, BASE STATION, MOBILE STATION, AND PROGRAM

REFERENCE TO RELATED APPLICATION

This is a Continuation Application of U.S. patent application Ser. No. 17/071,648 filed Oct. 15, 2020, which is a Continuation Application of Ser. No. 16/149,362 filed Oct. 2, 2018, (Now U.S. Pat. No. 10,849,126), which is a Continuation Application of U.S. patent application Ser. No. 15/651,341, filed Jul. 17, 2017, (Now U.S. Pat. No. 10,117,250), which is a Continuation Application of U.S. patent application Ser. No. 15/282,856 filed Sep. 30, 2016, (Now U.S. Pat. No. 9,743,410),which is a Continuation Application of U.S. patent application Ser. No. 15/008,090 filed on Jan. 27, 2016, (Now U.S. Pat. No. 9,474,074), which is a Continuation Application of U.S. patent application Ser. No. 14/669,932, (Now U.S. Pat. No. 9,277,545 B2), which is a Continuation Application of U.S. patent application Ser. No. 13/551,296 (Now U.S. Pat. No. 9,031,034 B2), which is a Continuation Application of U.S. patent application Ser. No. 12/735,993 (Now U.S. Pat. No. 8,953,551 B2), which is a National Stage Application of PCT Application No. PCT/JP2009/055259, filed on Mar. 18, 2009, which is based on the Japanese Patent Application No. JP 2008-072581, filed on Mar. 19, 2008, the entire contents of which is incorporated herein by reference.

TECHNICAL FIELD

The present invention relates to a mobile wireless system, and a setting method for wireless communications.

BACKGROUND ART

To fulfill requirements of speedup in mobile wireless communications, broadband wireless communications become essential. In broadband mobile wireless communications, influence of a plurality of delay paths causes frequency selective phasing to arise on a frequency axis, with which channel quality (or Channel Quality Indicator: CQI) varies. Moreover, when considering multiple access in which a base station communicates with a plurality of mobile stations (also referred to as User Equipments: UE's), the mobile stations communicate with the base station in different environments, so that CQI in the frequency domain is different from mobile station to mobile station. Thus, it has been known that system throughput is improved by making scheduling comprising comparing CQI in the frequency domain for a mobile station with each other, and allocating a sub-carrier with excellent CQI to each mobile station. Such scheduling is generally referred to as channel dependent frequency scheduling or frequency domain channel-dependent scheduling.

According to Long Term Evolution (LTE) being currently standardized in the 3rd Generation Partnership Project (3GPP), Orthogonal Frequency Division Multiplexing (OFDM) is adopted for a downlink access scheme. The aforementioned channel-dependent frequency scheduling is applied to an LTE downlink, and a plurality of frequency blocks can be allocated per mobile station, where a frequency block is composed of resource blocks (each of which is composed of a plurality of sub-carriers) that are consecutive on the frequency axis within one transmit time Interval (TTI). FIG. 17 shows an example of frequency block allocation in an LTE downlink. This represents a case in which four mobile stations are scheduled within one TTI in a system band. The frequency block count for mobile station 1 (UE1) is three, the frequency block count for mobile station 2 (UE2) is two, the frequency block for mobile station 3 (UE3) counts two, and the frequency block for mobile station 4 (UE4) counts one.

On the other hand, for an access scheme in an LTE uplink, Single Carrier-Frequency Division Multiplexing Access (SC-FDMA) is adopted (which is also referred to as Discrete Fourier Transform-spread-OFDM (DFT-s-OFDM) in a transmitter configuration for sub-carrier mapping in the frequency domain.) In an LTE uplink, again, channel-dependent frequency scheduling is applied; however, to hold the Peak to Average Power Ratio (PAPR) down to a smaller value, a limit is placed in allocating consecutive resource blocks per mobile station within one TTI. This means that the frequency block count is always one. FIG. 18 shows an example of frequency block allocation in an LTE uplink. As with FIG. 17, this represents a case in which four mobile stations are scheduled within one TTI in a system band. The frequency block count for any one of mobile stations 1-4 (UE1-UE4) is always one.

Non-patent Document 1 has proposed contemplation of improvement of system throughput by adopting an access scheme (which will be sometimes referred to as Multi-Carrier FDMA (MC-FDMA) hereinbelow), which allows allocation of a plurality of frequency blocks per mobile station within one TTI, as an extended version of SC-FDMA, to enhance a multi-diversity effect in frequency scheduling. It should be noted that the Multi-Carrier FDMA (MC-FDMA) is a scheme sometimes referred to as FDMA-Adaptive Spectrum Allocation (FDMA-ASA).

FIG. 19 shows exemplary SC-FDMA and MC-FDMA transmitter configurations, and their spectra. The block configurations in the SC-FDMA and MC-FDMA transmitters are the same, which is comprised of a data generating section 1701, a DFT section 1702, a sub-carrier mapping section 1703, an IFFT (Inverse Fast Fourier Transform) section 1704, and a cyclic prefix section 1705.

First, data production is performed in the data generating section 1701, and signals in the time domain are transformed into those in the frequency domain at the DFT section 1702, which are then supplied to the sub-carrier mapping section 1703 as input. A difference between SC-FDMA and MC-FDMA is the limit of the frequency block count in mapping sub-carriers in the sub-carrier mapping section. While the frequency spectrum is always continuous in SC-FDMA (frequency block count=1), it may be discrete in MC-FDMA (frequency block count>1). Next, at the IFFT section 1704, the signals in the frequency domain is transformed into those in the time domain, which are then added with a cyclic prefix, and transmitted. Cyclic prefix addition refers to an operation of copying a tail of data to a head of a block, as shown in FIG. 20. The cyclic prefix is inserted for the purpose of effectively implementing frequency domain equalization on the receiver side. The length of the cyclic prefix is desirably set such that the maximum delay time of delay paths in the channel is not exceeded.

Moreover, PAPR in OFDM increases as the number of sub-carriers becomes larger. However, an increase of PAPR is significantly reduced for a number of sub-carriers of the order of 50, at which PAPR is almost saturated. In broadband transmission in which the multi-user diversity effect can be expected, the number of sub-carriers is usually greater than 50, in which case improvement of PAPR cannot be expected even with a smaller frequency block count. On the other hand, since in MC-FDMA, a frequency spectrum that is discrete on the frequency axis is introduced for a larger frequency block count, resulting in higher PAPR. Therefore, improvement of PAPR can be expected by holding the frequency block count down to a smaller value in MC-FDMA.

By increasing the frequency block count, the degree of freedom in allocating resource blocks becomes higher, and the multi-diversity effect in channel-dependent frequency scheduling is enhanced. However, when the frequency block count is increased, the overhead due to notification of information on resource block allocation may be greater. In fact, a bitmap method (a notification method suitable for a larger frequency block count), which is currently being studied for adoption in notification of information on resource block allocation in an LYE downlink (see Non-patent Documents 2, 3), has a greater overhead than that in a tree-based method (a notification method suitable for a smaller frequency block count) for use in notification of information on resource block allocation in an LTE uplink (see Non-patent Document 4).

In particular, in a case that 100 resource blocks are to be allocated, 100-bit scheduling information is required in using the bitmap method, whereas $\log_2 100 (100+1)/2=13$-bit scheduling information is required using the tree-based method (for frequency block=1). In practice, in an LTE downlink, a limit is imposed on the resource blocks to be allocated such that a maximum of 37-bit of scheduling information is used. Moreover, when the tree-based method is applied to a case with a larger frequency block count, a required number of bits in notification is (frequency block count) times larger than that in SC-FDMA in which the frequency block count is one. In particular, assuming that the overhead in using the tree-based method for frequency block count=1 is 13 bit as described above, the overhead is increased such as 13×2=26 bits for frequency block count=2, or 13×=52 bits for frequency block count=4.

Non-patent Document 1: "A Study on Broadband Single Carrier Transmission Technique using Dynamic Spectrum Control" by Keigo MASHIMA and Seiichi SAMPEI, Technical Report of IEICE, RCS2006-233, January 2007

Non-patent Document 2: 3GPP R1-074208, LG Electronics, "DL LVRB allocation approach 2," October 2007

Non-patent Document 3: 3GPP R1-072723, Mitsubishi Electric, "Scheduling Policy and Signaling way on DL Resource Allocation," June 2007

Non-patent Document 4: 3GPP R1-070881, NEC Group, NTT DoCoMo, "Uplink Resource Allocation for E-UTRA," February 2007

DISCLOSURE OF THE INVENTION

Problems To Be Solved By The Invention

As described above, since the number of patterns of resource block allocation is generally increased by increasing the frequency block count, the overhead due to scheduling information to be notified by a base station to a mobile station becomes higher. Therefore, the multi-diversity effect and the overhead due to scheduling information are in a tradeoff relationship. FIG. 21 is a system diagram of a technique relating to the present invention. The technique uses the same and fixed frequency block count for all mobile stations. Therefore, optimization taking account of the tradeoff between the multi-diversity effect and the scheduling overhead is not fully achieved.

Moreover, although it has been known that PAPR is dependent upon the frequency block count in an access scheme of MC-FDMA, the same and fixed frequency block count is nevertheless used for all mobile stations. Thus, the frequency block count is not set or updated taking account of PAPR.

For the reasons above, there is a problem that the achievable throughput is limited.

An object of the present invention is to provide techniques of setting the frequency block count taking account of the tradeoff between the multi-user diversity effect and the overhead due to scheduling information.

Means for Solving the Problems

The present invention for solving the problems described above is a wireless communication system, characterized in comprising a setting unit for setting the number of resource block groups, each of which is constructed of at least one or more consecutive resource blocks on a frequency axis.

The present invention for solving the problems described above is a mobile station, characterized in comprising a setting unit for setting the number of resource block groups, each of which is comprised of at least one or more consecutive resource blocks on a frequency axis.

The present invention for solving the problems described above is a mobile station, characterized in that said mobile station transmits data signals using resource blocks allocated by a base station so that the number of resource block groups, each of which is comprised of at least one or more consecutive resource blocks on a frequency axis, is equal to or smaller than a set value.

The present invention for solving the problems described above is a base station, characterized in comprising a setting unit for setting the number of resource block groups, each of which is comprised of at least one or more consecutive resource blocks on a frequency axis.

The present invention for solving the problems described above is a setting method for wireless communications, characterized in comprising setting the number of resource block groups, each of which is comprised of at least one or more consecutive resource blocks on a frequency axis.

The present invention for solving the problems described above is a program, characterized in causing a mobile station to execute setting processing of setting the number of resource block groups, each of which is comprised of at least one or more consecutive resource blocks on a frequency axis.

The present invention for solving the problems described above is a program, characterized in causing a mobile station to execute the processing of transmitting data signals using resource blocks allocated by a base station so that the number of resource block groups, each of which is comprised of at least one or more consecutive resource blocks on a frequency axis, is equal to or smaller than a set value.

The present invention for solving the problems described above is a program, characterized in causing a base station to execute setting processing of setting the number of resource block groups, each of which is comprised of at least one or more consecutive resource blocks on a frequency axis.

Effects Of The Invention

According to the present invention, system throughput can be improved by holding down an increase of the overhead due to scheduling information while enhancing the multi-user diversity effect. This is because the present invention is configured to set an appropriate frequency block count depending upon the environment or condition of communications in the base station (cell) or mobile station.

Thus, the overhead due to scheduling information averaged for the whole cell can be reduced.

BRIEF DESCRIPTION OF THE DRAWINGS

FIG. 5 A schematic table showing a first example of selection of a maximum frequency block count in accordance with the first embodiment.

FIG. 6 A schematic table showing a second example of selection of a maximum frequency block count in accordance with the first embodiment.

FIG. 10 A schematic table showing a first example of selection of a maximum frequency block count in accordance with the second embodiment.

FIG. 11 A schematic table showing a second example of selection of a maximum frequency block count in accordance with the second embodiment.

FIG. 23 An operation flow chart for a base station and a mobile station in downlink control in the second embodiment.

FIG. 24 An operation flow chart for a base station and a mobile station in downlink control in the third embodiment.

EXPLANATION OF SYMBOLS

20, 80, 120 Base station
30, 130 Mobile station

BEST MODES FOR CARRYING OUT THE INVENTION

The present invention is characterized in setting a frequency block count to be allocated to the same user to an appropriate value based on a communication capability, a communication environment, and system information, which is information affecting the communication environment, for a base station or a mobile station. That is, it is characterized in setting a maximum frequency block count, which is the largest value of the frequency block count to be allocated to the same user, to an appropriate value. By imposing a limit on the frequency block count, an increase of the overhead due to scheduling information averaged for the whole cell is prevented. It should be noted that the frequency block refers to a resource block group comprised of one or more consecutive resource blocks.

In MC-FDMA, in which an output of transmitter DFT (Discrete Fourier Transform) in DFT-spread-OFDM (Discrete Fourier Transform-spread-Orthogonal Frequency Division Multiplexing) is allocated to at least one or more resource block groups described above, an increase of PAPR in mobile stations in the periphery of a cell is problematic unless a limit is imposed on the frequency block count because PAPR is increased as the frequency block count becomes higher. According to the present invention, the problem of the PAPR increase in mobile stations in the periphery of a cell is avoided by setting an maximum allowable frequency block count on a base station (cell)-by-base station basis, on a mobile station-by-mobile station basis, or on a mobile station group-by-mobile station group basis, based on information such as system information for a base station or a mobile station.

In particular, in circumstances where it is desirable to enhance the multi-user diversity effect (where the system band is wide, where CQI is acceptable, or the like), the maximum frequency block count is set to a larger value; in circumstances where it is desirable to hold down an increase of the overhead (where the system band is narrow, where CQI is poor, or the like), the maximum frequency block count is set to a smaller value.

Subsequently, a technique relating to resource block allocation in accordance with the present invention will be described with reference to the accompanying drawings.

First Embodiment

In a first embodiment, a configuration in which the maximum frequency block count is selected on a base station (cell)-by-base station basis will be described.

Figure 1:
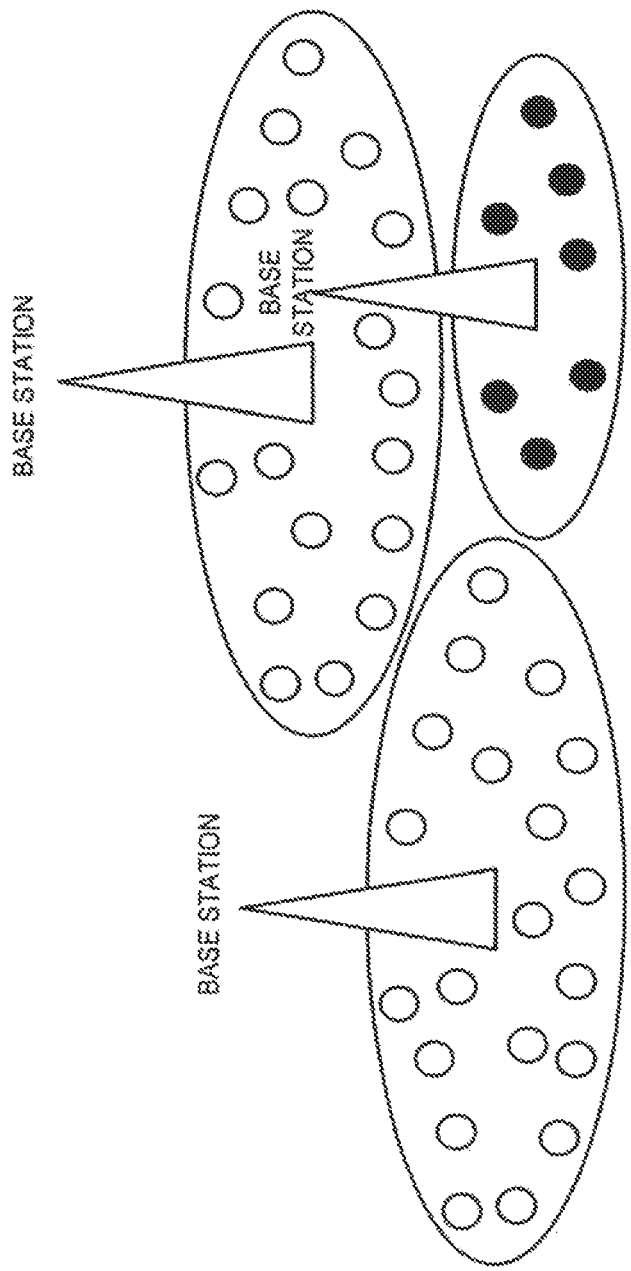
FIG. 1 A diagram showing a mobile communications system in a first embodiment.

FIG. 1 is a diagram showing a case in which the maximum frequency block count is switched according to the size of a base station (cell).

In this case, since a sufficient margin of the transmit power may be allowed for a smaller cell size, the transmit bandwidth can be increased. In such a case, since a greater multi-diversity effect can be expected, the frequency block count is set to a larger value. On the other hand, since a base station (cell) with a larger cell size allows for an insufficient margin of the transmit power, the transmit bandwidth is reduced. In such a case, since a greater multi-diversity effect cannot be expected, the maximum frequency block count is decreased to reduce the overhead due to scheduling information.

Figure 2:
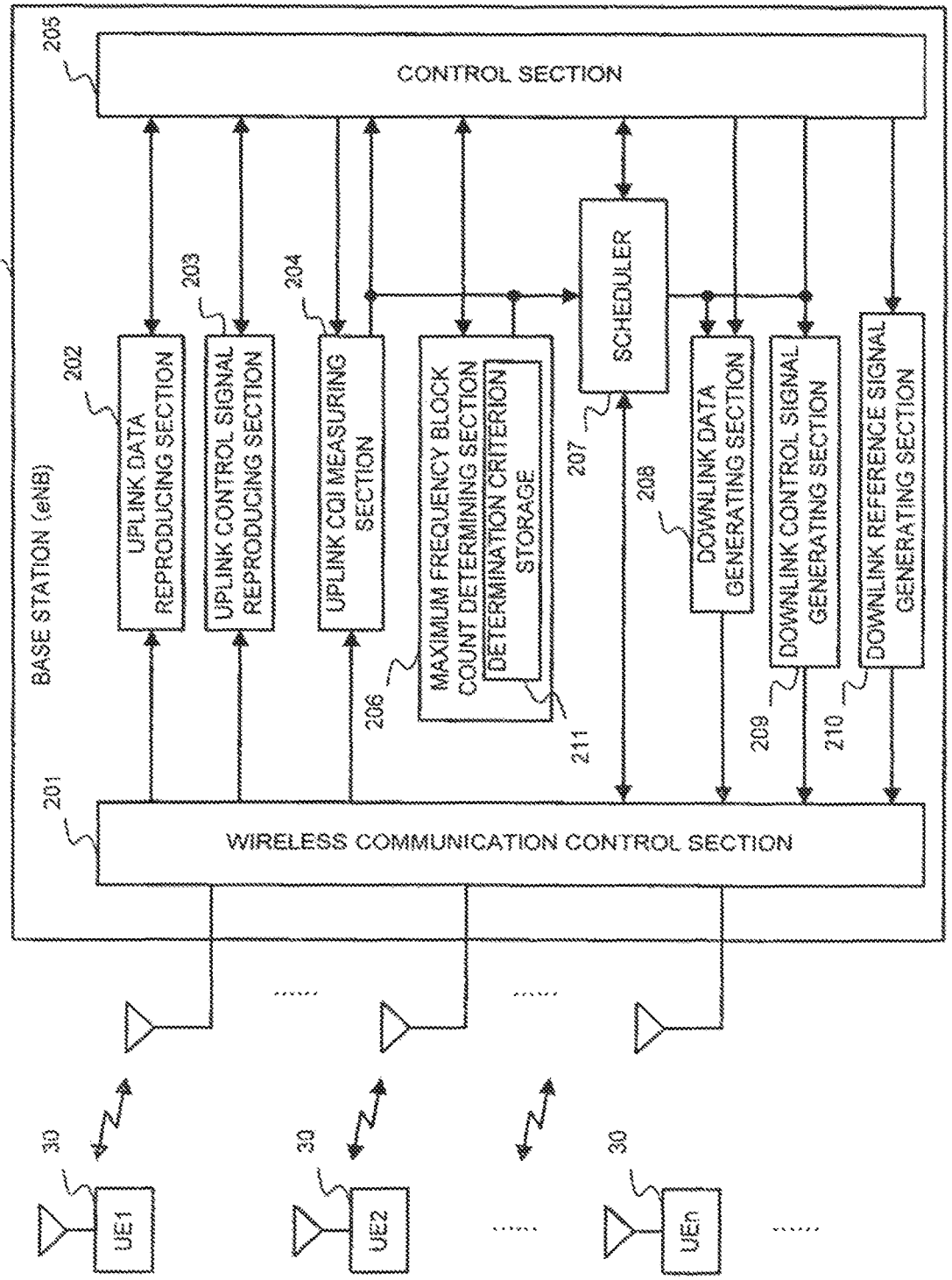
FIG. 2 A block diagram showing a main configuration of a base station in the mobile communications system to which the first embodiment is applied.

FIG. 2 is a block diagram showing a main configuration of a base station in a mobile communications system to which the first embodiment is applied. It is assumed here that a base station 20 accommodates a plurality of mobile stations 30 (UE1, UE2, . . . ). The base station and mobile stations communicate with one another using an OFDM (Orthogonal Frequency Division Multiplexing) scheme or an MC-FDMA scheme.

A wireless communication control section 201 controls communications with the plurality of mobile stations UE. For example, the wireless communication control section 201 separates multiplexed signals received from the plurality of mobile stations UE and outputs them to an uplink data reproducing section 202, an uplink control signal reproducing section 203 and an uplink CQI measuring section 204; it also multiplexes several kinds of transmit signals from a downlink data generating section 208, a downlink control signal generating section 209 and a downlink reference signal generating section 210 according to a frequency/time multiplexing configuration determined at a scheduler 207, and transmits them to the plurality of mobile stations.

The uplink CQI measuring section 204 receives sounding reference signals from the mobile stations UE to measure an uplink CQI, and outputs it to the control section 205 and scheduler 207. As used herein, a sounding reference signal is a reference signal for use in uplink CQI measurement or link adaptation, and is transmitted by a mobile station to a base station (the signal being sometimes referred to as pilot signal).

A maximum frequency block count determining section 206 accepts system information as input from the control section 205, which information indicates the cell size for the own base station, and the communication capability of the base station such as the system bandwidth of the cell. The maximum frequency block count determining section 206 looks up a determination criterion storage 211 to determine a maximum frequency block count specific to the cell according to the supplied system information, and outputs it to the control section 205. It should be noted that a determination criterion table stored in the determination criterion storage 211 may be factory-supplied, or may be appropriately set or modified during installation or after installation in the field.

The scheduler 207 uses the uplink CQI measured for each mobile station UE while taking account of the maximum frequency block count determined at the maximum frequency block count determining section 206 to make channel-dependent frequency scheduling (resource allocation) under control of the control section 205. The scheduler 207 outputs a result of downlink data scheduling to the downlink data generating section and a result of uplink data scheduling (scheduling information) to the downlink control generating section 209, which are in turn transmitted to the mobile stations by the wireless communication control section 201. Now the transmission of a result of scheduling transmitted to mobile stations will be described below. A resource allocation field in scheduling information (UL grant) notified through a downlink control signal is composed of one or more resource indication values (RIV). A resource indication value $RIV_n$ for an n-th frequency block represents a start resource block ($RB_{start,n}$) or start position, and a length ($L_{CRBs,n}$) or the number of consecutive resource blocks. The resource indication value $RIV_n$ is notified to a mobile station with Physical Downlink Control Channel (PDCCH), for example. $N_{RIV}$ represents the maximum number of resource indication values, that is, the maximum frequency block count, where the value of $N_{RIV}$ is broadcast as part of system information. An n-th resource indication value $RIV_n$ is defined by EQ. 1 below. It should be noted that $L_{CRBs,n}$ and $RB_{start,n}$ may be broadcast as separate pieces of information.

if $$(L_{CRBs,u}-1) \leq \lfloor N_{RB}^{UL}/2 \rfloor$$

then $$RIV_n = N_{RB}^{UL}(L_{CRBs,n}-1) + RB_{START,n}$$

else $$RIV_n = N_{RB}^{UL}(N_{RB}^{UL} - L_{CRBs,n}+1) + (N_{RB}^{UL}-1-RB_{START,n}) \quad \text{(EQ. 1)}$$

where $N^{UL}_{RB}$ is the number of resource blocks in the whole system.

Moreover, $N_{RIV}$ is sent through a higher layer control signal mapped to Physical Broadcast Channel (PBCH) or Physical Downlink Shared Channel (PDSCH). It should be noted that the initial value of $N_{RIV}$ is defined as a fixed value beforehand, or sent through a higher layer control signal mapped to PBCH or PDSCH.

Figure 3:
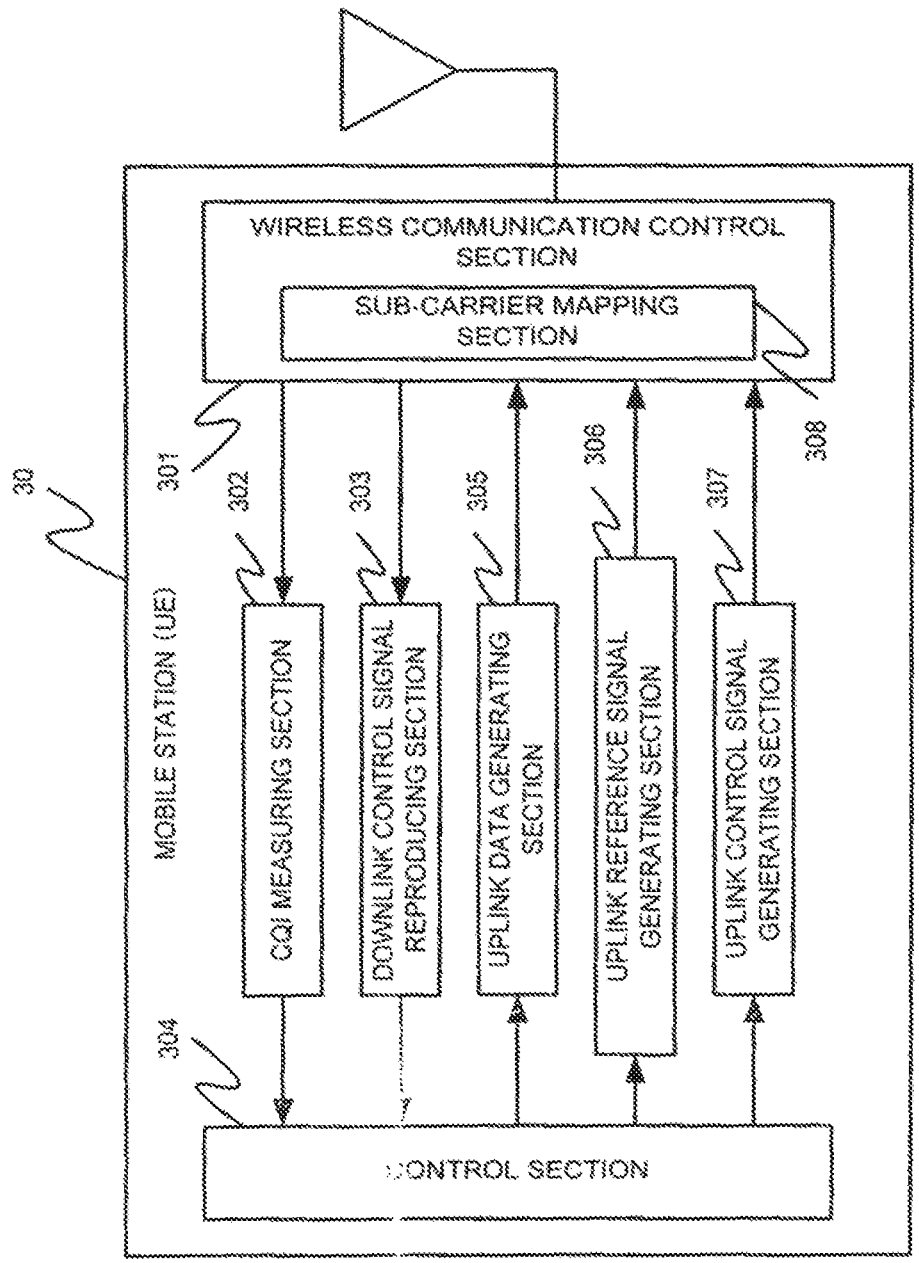
FIG. 3 A block diagram showing a main configuration of a mobile station in the mobile communications system to which the first embodiment is applied.

FIG. 3 is a block diagram showing a main configuration of a mobile station in the mobile communications system to which the first embodiment is applied. Since the mobile station 30 does not perform resource management, resource blocks for use in transmission/reception is set according to a downlink control signal received from the base station 20.

In FIG. 2, from multiplexed signals received from the base station 20 by a wireless communication control section 301, a downlink reference signal is used to make CQI measurement at the CQI measuring section 302, and scheduling information is extracted by the downlink control signal reproducing section 303. According to the scheduling information notified by the base station, the control section 304 controls an uplink data generating section 305, an uplink reference signal generating section 306, an uplink control signal generating section 307, and a sub-carrier mapping section 308 in the wireless communication control section 301.

According to the scheduling information notified by the base station via the downlink control signal, the sub-carrier mapping section 308 performs subcarrier mapping, and data is transmitted.

Especially in a case that a frequency block count of one or more is used to perform data transmission in MC-FDMA, a CAZAC (Constant Amplitude Zero Auto-Correlation) sequence used in a reference signal (sometimes referred to as demodulation reference signal) for use in demodulation of PUSCH (Physical Uplink Shared Channel; through which user data is mainly transmitted) has a sequence length matching the transmit bandwidth of all frequency blocks, not the bandwidth of each frequency block.

Figure 22:
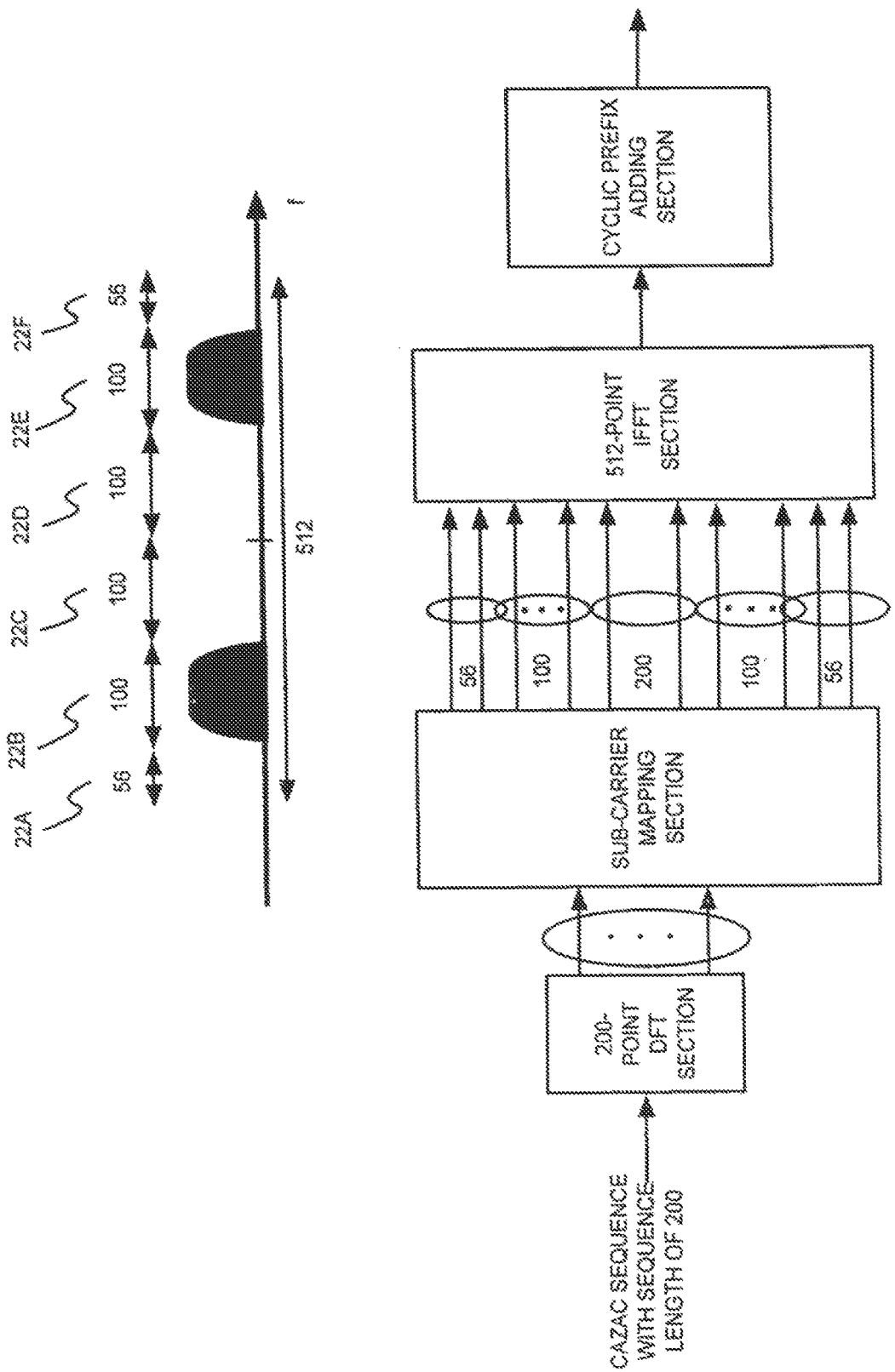
FIG. 22 A diagram for explaining a CAZAC sequence for use in a reference signal in the present invention.

As one example, assume that transmission is made with sub-carrier mapping as shown in FIG. 22 in a condition that the number of sub-carriers is 200, the frequency block count is two, and the number of IFFT points is 512. In this case, a CAZAC sequence matching the transmit bandwidth of all frequency blocks, which is the transmit bandwidth of the two frequency blocks in this example because the transmit bandwidth of each frequency block is 100 (reference symbols 22B and 22E in FIG. 22), is caused, and then, is transformed into signals in the frequency domain at the DFT section, and sub-carrier mapping is applied to the same band as that for transmitting PUSCH (data signal) for spreading. At that time, the band through which no PUSCH is transmitted (22A, 22C, 22D, and 22F in FIG. 22) is filled with zero.

It should be noted that the CAZAC sequence refers to a sequence having a constant amplitude and an autocorrelation value of zero at a non-zero phase difference both in the time and frequency domains. Since PAPR can be held down to a smaller value because of a constant amplitude in the time domain, and since the amplitude is also constant in the frequency domain, it is a sequence suitable for channel estimation in the frequency domain. The sequence also has an advantage that it is suitable for timing detection for received signals because of its perfect autocorrelation property.

Figure 4:
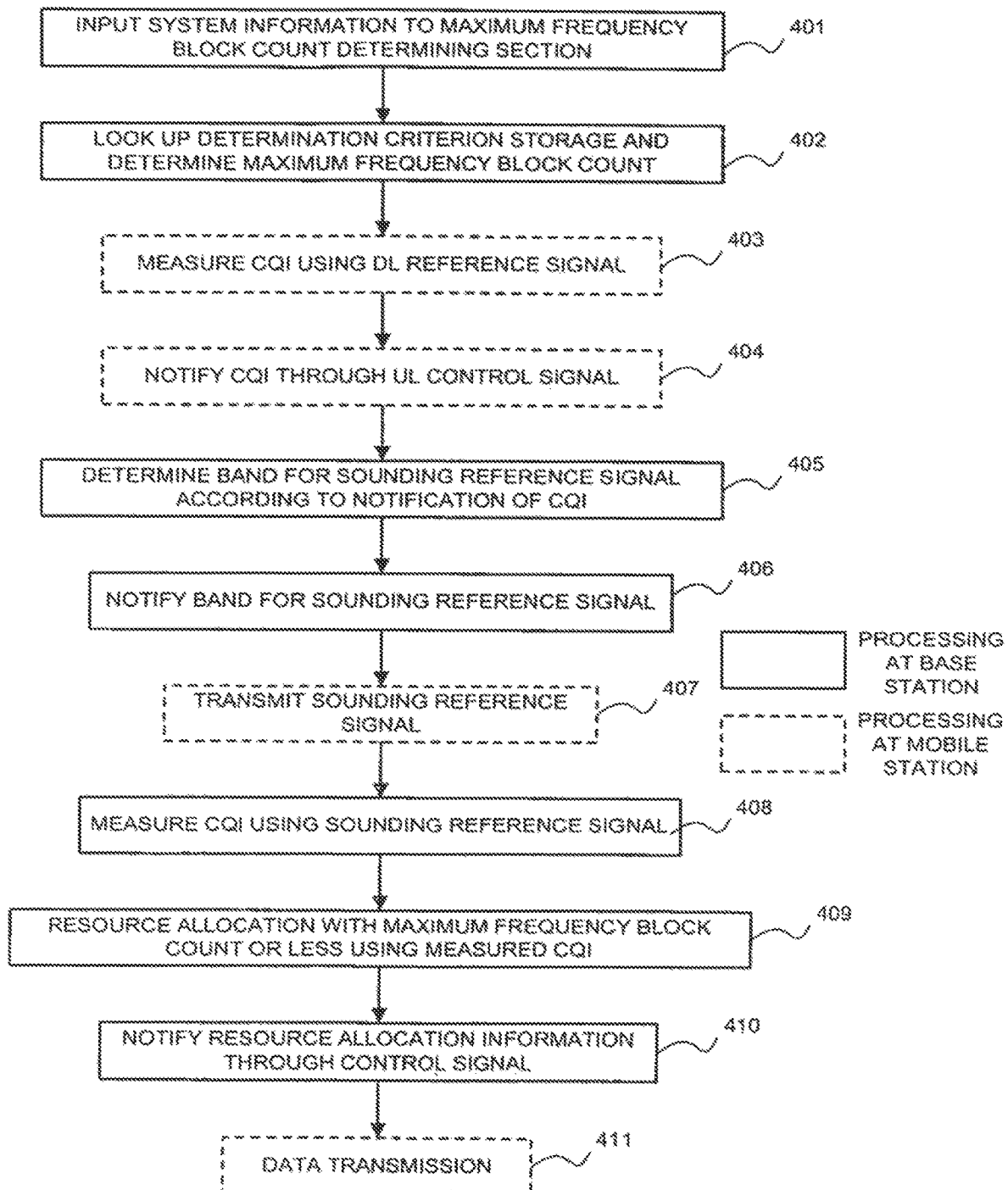
FIG. 4 A chart showing an operation flow of the base station and mobile station in the first embodiment.

FIG. 4 shows an operation flow of the base station and mobile station in the first embodiment. In FIG. 4, steps indicated by solid-line boxes designate an operation of the base station, and those indicated by dotted-line boxes designate an operation of the mobile station.

First, the control section 205 in the base station inputs system information such as the cell size for the own base station to the maximum frequency block determining section 206 (Step 401).

Next, the maximum frequency block determining section 206 looks up the determination criterion storage 211, and selects a maximum frequency block count specific to the base station depending upon the system information (Step 402).

Next, the CQI measuring section 302 in the mobile station UE uses a downlink reference signal to measure downlink CQI (Step 403).

An uplink control signal written with the downlink CQI measured at Step 403 is generated at the uplink control signal generating section 307, and is transmitted via the wireless communication control section 301 to thereby notify the downlink CQI to the base station (Step 404).

The control section 205 in the base station determines a band for an uplink sounding reference signal based on the downlink CQI notified at Step 404 (Step 405), and notifies it to the mobile station via the downlink control signal (Step 406).

The uplink reference signal generating section 306 in the mobile station transmits a sounding reference signal according to the notification at Step 406 (Step 407).

The uplink CQI measuring section 204 in the base station receives the sounding reference signal transmitted at Step 407, and measures CQI (Step 408).

Next, the scheduler 207 in the base station makes scheduling so that the frequency block count is equal to or smaller than the maximum frequency block count selected by the maximum frequency block count determining section 206 at Step 402 (Step 409), and notifies the scheduling information to the mobile station through a downlink control signal (Step 410). At that time, the downlink control signal generating section 209 generates a resource indication value $RIV_n$ using EQ. (1) given earlier, and notifies it.

Finally, the wireless communication control section 301 in the mobile station transmits uplink data according to the notification at Step 410 (Step 411). At that time, it causes a CAZAC sequence matching the transmit bandwidth of all frequency blocks, transforms the sequence into signals in the frequency domain at the DFT section, and then, sub-carrier maps a reference signal for use in demodulation of data in the same band as that for transmitting data signals. The data signal and reference signal are time division multiplexed (TDM).

In the first embodiment, the maximum frequency block count ($N_{RIV}$) selected at Step 402 may be notified by the base station to the mobile station through a higher layer control signal mapped to Physical Broadcast Channel (PBCH) or Physical Downlink Shared Channel (PDSCH). It is believed that uplink scheduling information (UL grant) contained in the downlink control signal becomes larger for a higher frequency block count. In this case, the base station may notify the maximum frequency block count to the mobile station, and determine a range of detection of a downlink control signal based on the maximum frequency block count, whereby a range of the scheduling information looked up by the mobile station can be confined. As a result, processing of detecting a control signal can be reduced.

Now a first example of setting of a maximum frequency block count according to the first embodiment of the present invention will be described. In this example, a maximum frequency block count is determined depending upon the cell size, which is information affecting the communication environment. FIG. 5 is an example of a table stored in the aforementioned determination criterion storage 211. The cell size shown is larger for a larger value (3>2>1). In particular, for cell 1 and cell 2 having a smaller cell size of one, the maximum frequency block count is set to four; for cell 3 having a cell size of two, the maximum frequency block count is set to two; and for cell 4 having a larger cell size of three, the maximum frequency block count is set to one, with which the problem of PAPR is smaller.

A second example of selection of a maximum frequency block count according to the first embodiment of the present invention will be described. In this example, a maximum frequency block count is determined depending upon the system bandwidth in the base station (cell), which is information about the communication environment. FIG. 6 is an example of a table stored in the aforementioned determination criterion storage 211. In particular, cell 1 and cell 3 have a larger system bandwidth of 50 MHz. Thus, the maximum frequency block count is set to four to aim at the multi-user diversity effect. Cell 2 has a smaller system bandwidth of 1.25 MHz. Therefore, a large multi-user diversity effect cannot be expected, so that the maximum frequency block count is set to one to reduce the overhead due to scheduling information. Since cell 4 has a system bandwidth of 20 MHz, the maximum frequency block count is set to two, taking account of a tradeoff between the multi-user diversity effect and the overhead.

It should be noted that information for use in selection of a maximum frequency block count may be information other than the cell size or system bandwidth described above. For example, it may be information about the communication environment such as the coverage of a base station, channel quality information measured by a downlink reference signal, bandwidth of downlink data signals, and number of levels in multi-level modulation for downlink data signals, or information affecting the communication environment such as the code rate. Moreover, since the cell size described above is determined by information affecting the communication environment such as the position of a base station, distance between base stations, and interference power, the maximum frequency block count may be selected using such information According to the first embodiment, an appropriate maximum frequency block count is set on a base station (cell)-by-base station basis depending upon system information such as the cell size or system bandwidth, so that improvement of throughput can be expected independent of an access scheme (OFDM, MC-FDMA, etc.). Moreover, an effect of simplifying processing at a mobile station can be expected by broadcasting the amount of information on scheduling, which varies with the maximum frequency block count.

Furthermore, when switching the maximum frequency block count according to, for example, the cell size, an increase of PAPR can be prevented by reducing the frequency block count in MC-FDMA, and therefore, an additional effect can be expected. In particular, PAPR in mobile stations in the periphery of a cell is problematic for a cell having a larger size, and accordingly, the maximum frequency block count is reduced to avoid an increase of PAPR. On the other hand, a cell that has a smaller size and is isolated with smaller interference effects from other cells has a sufficient margin of the transmit power and PAPR is not significantly problematic, so that the maximum frequency block count is set to a larger value to aim at improvement of throughput from the multi-diversity effect.

Further, in a case that a frequency block count of one or more is used to perform transmission in MC-FDMA, the property of a CAZAC sequence for use in a reference signal for use in demodulation of PUSCH is prevented from being deteriorated even in transmission using a plurality of frequency blocks by matching the CAZAC sequence for the reference signal to a transmit bandwidth of all frequency blocks. Thus, a PAPR property and channel quality measurement precision equivalent to those for frequency block count=1 can be obtained.

It should be noted that setting of a maximum frequency block count may be performed at initial setting in installation of a base station, each time scheduling is made, periodically, or at discretion.

Second Embodiment

While the maximum frequency block count is selected on a base station (cell)-by base station basis in the first embodiment, it is selected on a mobile station UE-by-mobile station basis in a second embodiment.

For example, a maximum frequency block count is determined according to a mobile station class (sometimes referred to as UE class) for each mobile station. The mobile station class refers to a class of the capability of a mobile station classified according to information on the communication capability of the mobile station, such as the transmit bandwidth, peak rate of transmission data, and number of transmit antennas, where a higher mobile station class corresponds to a mobile station capable of transmission at a higher speed. In particular, a mobile station of a low mobile station class has a smaller transmittable bandwidth. In this case, since the multi-user diversity effect, which is obtained by a multiplicity of discrete resource blocks (frequency blocks) allocated on a frequency axis, becomes smaller, the maximum frequency block count is reduced to aim at reduction of the overhead. On the other hand, a mobile station of a higher mobile station class has a larger transmittable bandwidth. In this case, since the multi-user diversity effect, which is obtained by discrete resource blocks allocated on a frequency axis, is enhanced, the maximum frequency block count is increased to aim at improvement of throughput.

Figure 7:
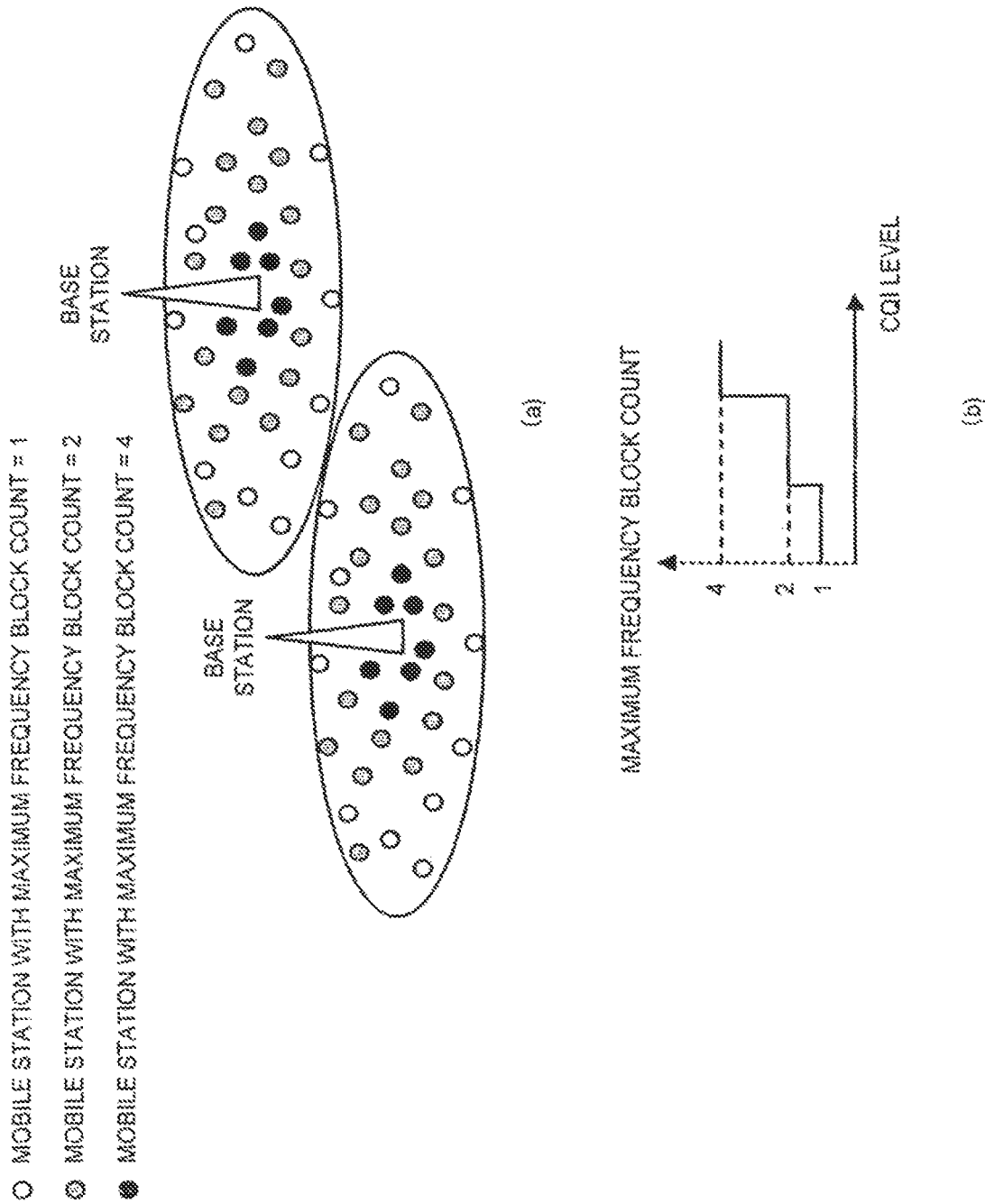
FIG. 7 A diagram showing a mobile communications system in a second embodiment.

Moreover, when the access scheme is MC-FDMA, a maximum frequency block count may be selected depending upon CQI of each mobile station. FIG. 7(*a*) is a system diagram in selecting a maximum frequency block count according to CQI of a mobile station. For mobile stations in the periphery of a cell, the maximum frequency block count is set to one to avoid an increase of PAPR, and coverage is enlarged. On the other hand, since PAPR is not significantly problematic in other mobile stations, the maximum frequency block count is set to a larger value, such as two, four, to aim at improvement of throughput from the multi-diversity effect. FIG. 7(*b*) is a diagram showing a relationship between a CQI level and a maximum frequency block count, where the maximum frequency block count is set to a larger value for a higher CQI level.

Figure 8:
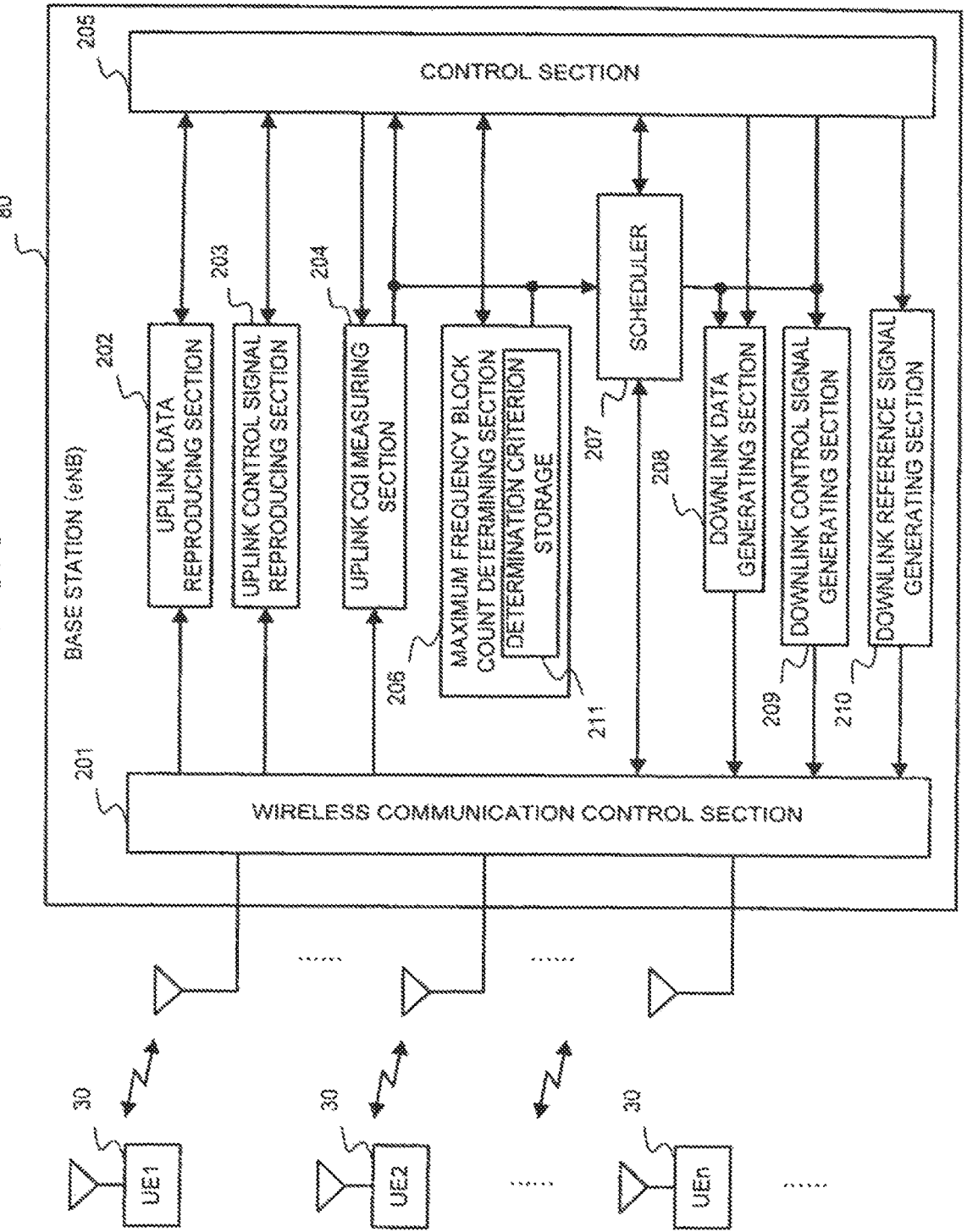
FIG. 8 A block diagram showing a main configuration of a base station in a mobile communications system to which the second embodiment is applied.

FIG. 8 is a block diagram showing a main configuration of a base station in a mobile communications system to which the second embodiment is applied. Since this is generally similar to that in the first embodiment, differences will be described below.

In the second embodiment, CQI measured at the uplink CQI measuring section 204 is input to the maximum frequency block count determining section 206. The maximum frequency block count determining section 206 looks up the determination criterion storage 211 to determine a maximum frequency block count specific to the mobile station, and outputs it to the control section 205. It should be noted that a determination criterion table stored in the determination criterion storage 211 may be factory-supplied, or may be appropriately set or modified during installation or after installation in the field.

The maximum frequency block count determining section 206 determines a maximum frequency block count based on the CQI measured at the uplink CQI measuring section 204 and on information supplied by the control section 205 and contained in an uplink control signal from the mobile station UE (mobile station class, type of data transmission, etc.), and outputs it to the control section 205. It should be noted that in determining the maximum frequency block count, time-averaged CQI measured for reducing an effect such as an interference effect from other cells may be employed.

The main configuration of the mobile station UE in the mobile communications system to which the second embodiment is applied is similar to that of the first embodiment shown in FIG. 3, and therefore, explanation thereof will be omitted.

Figure 9:
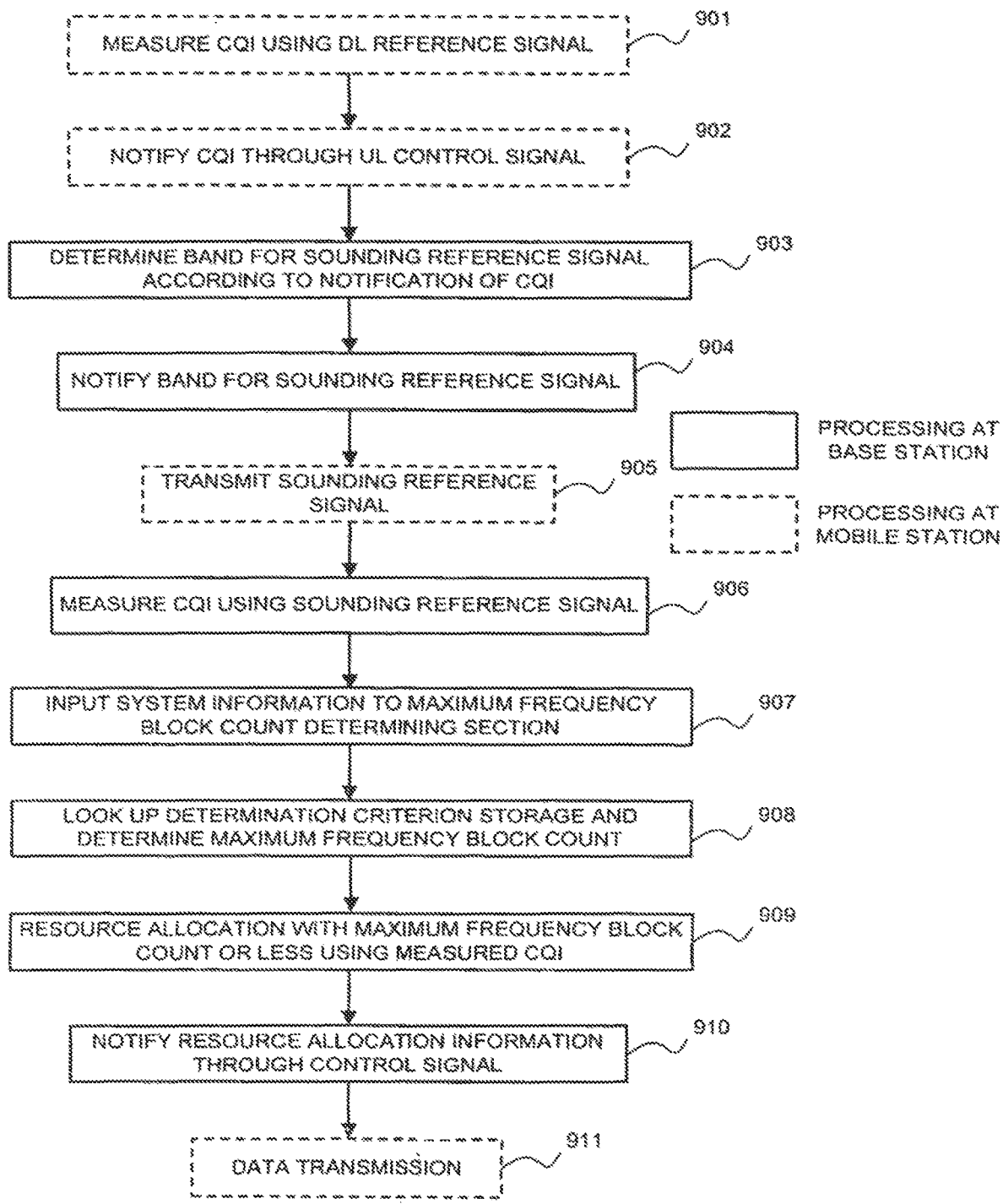
FIG. 9 A chart showing an operation flow of the base station and mobile station in the second embodiment.

FIG. 9 shows an operation flow of the base station and mobile station in the second embodiment. In FIG. 9, steps indicated by solid-line boxes designate an operation of the base station, and those indicated by dotted-line boxes designate an operation of the mobile station.

First, the CQI measuring section 302 in the mobile station UE uses a downlink reference signal to measure downlink CQI (Step 901).

An uplink control signal written with the downlink CQI measured at Step 901 is generated at the uplink control signal generating section 307, and is transmitted via the wireless communication control section 301 to thereby notify the downlink CQI to the base station (Step 902).

The scheduler 207 in the base station determines a band for an uplink sounding reference signal based on the downlink CQI notified at Step 902 (Step 903), and the downlink control signal generating section 209 generates a downlink control signal written with it, which is transmitted via the wireless communication control section 301 to be notified to the mobile station UE (Step 904).

The uplink reference signal generating section 306 in the mobile station UE generates a sounding reference signal according to the notification at Step 904, and transmits it (Step 905).

The uplink CQI measuring section 204 in the base station receives the sounding reference signal transmitted at Step 905 to make uplink CQI measurement (Step 906).

The uplink CQI measuring section 204 in the base station inputs the uplink CQI measured at Step 906 to the maximum frequency block determining section 206 (Step 907).

The maximum frequency block determining section 206 looks up the determination criterion storage 211 to determine a maximum frequency block count according to the uplink CQI (Step 908).

Next, the scheduler 207 in the base station makes scheduling so that the frequency block count is equal to or smaller than the maximum frequency block count determined at Step 908 (Step 909), and notifies the scheduling information to the mobile station through a downlink control signal (Step 910). At that time, the downlink control signal generating section 209 defines a resource indication value $RIV_n$ using EQ. (1) given earlier, and notifies it.

Finally, the wireless communication control section 301 in the mobile station transmits uplink data according to the notification at Step 910 (Step 911). At that time, it causes a CAZAC sequence matching the transmit bandwidth of all frequency blocks, transforms the sequence into signals in the frequency domain at the DFT section, and then, sub-carrier maps a reference signal in the same band as that for transmitting data signals. The data signal and reference signal are time division multiplexed (TDM).

Moreover, the base station may notify the maximum frequency block count ($N_{RIV}$) determined at Step 908 to the mobile station at Step 910 through a higher layer control signal mapped to PDSCH. It is believed that uplink scheduling information (UL grant) contained in the downlink control signal becomes larger for a higher frequency block count. In this case, the base station may notify the maximum frequency block count to the mobile station, and determine a range of detection of a downlink control signal based on the maximum frequency block count, whereby a range of the scheduling information looked up by the mobile station can be confined. As a result, processing of detecting a control signal can be reduced.

Now a first example of selection of a maximum frequency block count according to the second embodiment of the present invention will be described. In this example, a maximum frequency block count is set based on uplink CQI measured using an uplink sounding reference signal, which is information about the communication environment. FIG. 10 is an example of a table stored in the aforementioned determination criterion storage 211. The CQI level shown represents a larger size for a larger value (31>30, . . . , 1>0; when five bits are used in the current case, there are 32 levels). In this example, the maximum frequency block count is switched according to the measured CQI level. In particular, since the CQI level for UE1 is as high as 27, the maximum frequency block count is set to four; since the CQI levels for UE2 and UE4 are 18, 12, respectively, the maximum frequency block count is set to two; and since UE3 has a CQI level as low as three, the maximum frequency block count is set to one for eliminating the problem of PAPR.

A second example of selection of a maximum frequency block count according to the second embodiment of the present invention will be described. While the maximum frequency block count is determined depending upon the measured uplink CQI in the example above, the example here addresses a case in which the maximum frequency block count is set according to the mobile station class written in control information. The mobile station class refers to a communication capability of a mobile station defined by a condition of a mobile station, such as the transmit bandwidth, peak rate of transmission data, or number of transmit antennas. FIG. 11 shows an example of a table stored in the aforementioned determination criterion storage 211. The mobile station class is higher for a larger value. In particular, since UE1 has a mobile station class as high as three, the transmittable bandwidth is large. Thus, the maximum frequency block count is set to four to aim at the multi-user diversity effect. Since UE2 and UE4 have a mobile station class of one, the transmittable bandwidth is smaller. Thus, a large multi-user diversity effect cannot be expected, so that the maximum frequency block count is set to one to reduce the overhead due to scheduling information. Since UE3 has a mobile station class of two, the maximum frequency block count is set to two, taking account of a tradeoff between the multi-user diversity effect and the overhead.

While a case in which the maximum number of groups is determined based on the mobile station class and CQI measured by a sounding reference signal is addressed here, it may be contemplated that the second embodiment uses information about a communication environment, such as the bandwidth of an uplink sounding reference signal, bandwidth used in uplink data transmission, number of levels in multi-level modulation and code rate used in uplink data transmission, transmittable/receivable bandwidth of a mobile station (sometimes referred to as UE capability), and type of uplink transmission data (VoIP, HTTP, FTP etc.), or information affecting the communication environment, such as the billing scheme in which a user signs on, power headroom (which is a difference between the maximum transmit power of a mobile station and an actual transmit power of the mobile station), and target SINR in uplink power control.

Moreover, while the description has been made on a case in which the maximum frequency resource block count is determined on a mobile station-by-mobile station basis, mobile stations may be divided into groups based on a certain condition and the maximum frequency resource block count may be determined on a group-by-group basis.

Moreover, while allocation of uplink resource blocks is mainly described, the present invention is not limited thereto, and it is applicable to allocation of downlink resource blocks. An operation in this case will now be described with reference to FIG. 23.

First, the CQI measuring section 302 in the mobile station UE uses a downlink reference signal to measure downlink CQI (Step 2301).

An uplink control signal written with the downlink CQI measured at Step 901 is generated at the uplink control signal generating section 307, and is transmitted via the wireless communication control section 301 to thereby notify the downlink CQI to the base station (Step 2302).

The control section 205 in the base station inputs the downlink CQI notified at Step 2302 to the maximum frequency block count determining section 206 (Step 2303).

The maximum frequency block determining section 206 looks up the determination criterion storage 211 to determine a maximum frequency block count according to the downlink CQI (Step 2304).

Next, the scheduler 207 in the base station makes scheduling so that the frequency block count is equal to or smaller than the maximum frequency block count determined at Step 2304 (Step 2305).

Finally, the wireless communication control section 201 transmits downlink data based on a result of scheduling at Step 2305 (Step 2306). At that time, it causes a CAZAC sequence matching the transmit bandwidth of all frequency blocks, transforms the sequence into signals in the frequency domain at the DFT section, and then, sub-carrier maps a reference signal in the same band as that for transmitting data signals. The data signal and reference signal are time division multiplexed (TDM).

According to the second embodiment, an appropriate maximum frequency block count is set on a mobile station-by-mobile station basis depending upon the environment or condition of communications in the base station or mobile station, whereby further improvement of throughput can be expected independent of an access scheme (OFDM, MC-FDMA, etc.). Moreover, an effect of simplifying processing at the mobile station can be expected by notifying the amount of information on scheduling, which varies with the maximum frequency block count, from the base station to the mobile station.

Furthermore, when switching the maximum frequency block count according to, for example, the CQI, an increase of PAPR can be prevented by reducing the frequency block count in MC-FDMA, and therefore, an additional effect can be expected. In particular, PAPR is problematic in mobile stations having poor CQI, and accordingly, the maximum frequency block count is reduced to avoid an increase of PAPR. On the other hand, in mobile stations in which CQI is acceptable and PAPR is not significantly problematic, the maximum frequency block count may be set to a larger value to aim at improvement of throughput from the multi-diversity effect.

Further, in a case that a frequency block count of one or more is used to perform transmission in MC-FDMA, the property of a CAZAC sequence for use in a reference signal for use in demodulation of PUSCH is prevented from being deteriorated even in transmission using a plurality of frequency blocks by matching the CAZAC sequence for the reference signal to a transmit bandwidth of all frequency blocks. Thus, a PAPR property and channel quality measurement precision equivalent to those for frequency block count=1 can be obtained.

Third Embodiment

In the first and second embodiments, the maximum frequency block count is determined by a base station. According to a third embodiment described below, the maximum frequency block count is determined by a mobile station.

A system diagram in a mobile communications system to which the third embodiment is applied is similar to that of the second embodiment shown in FIG. 7, and therefore, explanation thereof will be omitted. Since the mobile station determines the maximum frequency block count in the third embodiment, the maximum frequency block count basically has a value specific to the mobile station.

Figure 12:
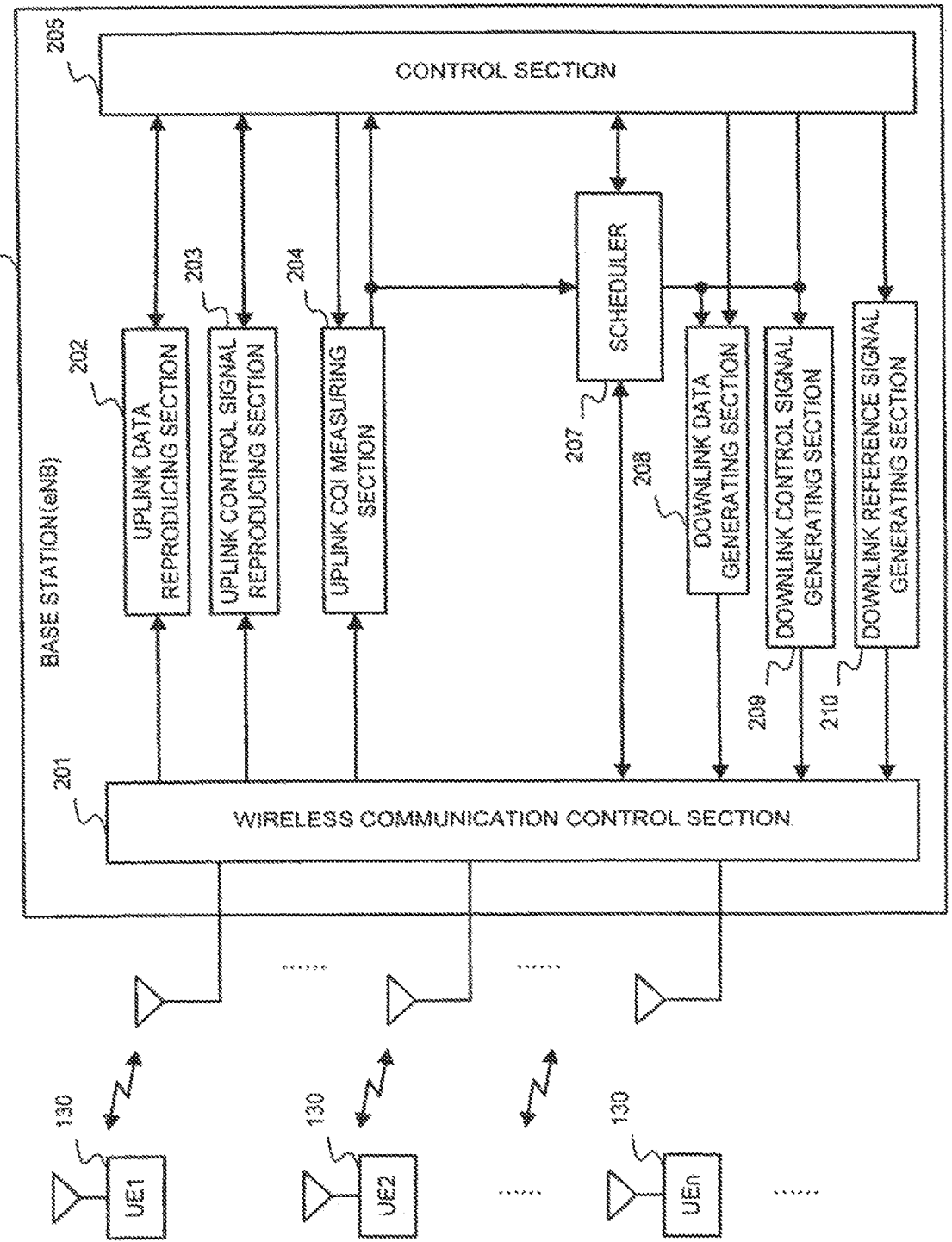
FIG. 12 A block diagram showing a main configuration of a base station in a mobile communications system to which a third embodiment is applied.
Figure 13:
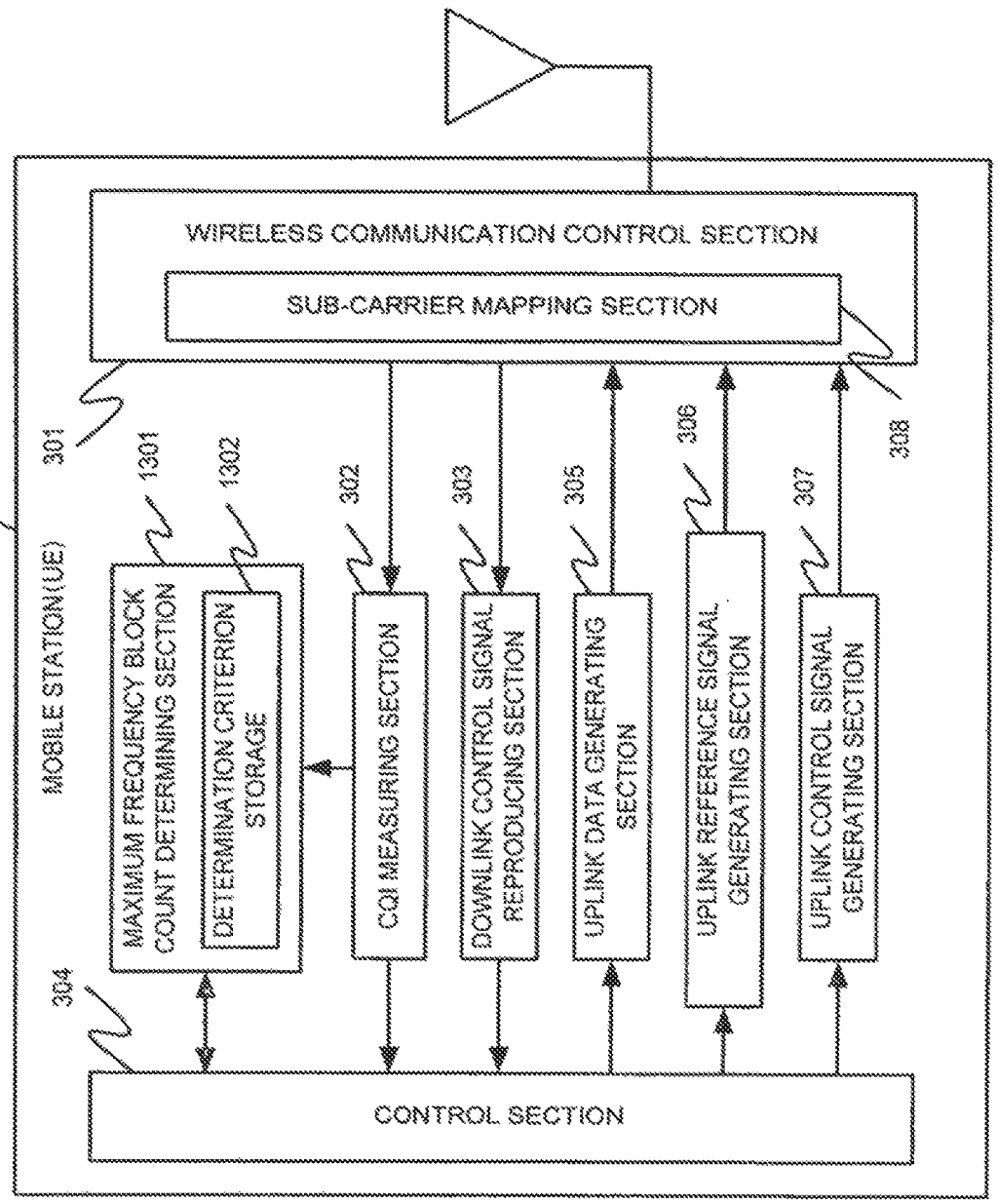
FIG. 13 A block diagram showing a main configuration of a mobile station in the mobile communications system to which the third embodiment is applied.

FIGS. 12, 13 are block diagrams showing the main configurations of a base station and a mobile station in a mobile communications system to which the second embodiment is applied. Since in the third embodiment, the maximum frequency block count is determined by a mobile station, the maximum frequency block count determining section 206 and determination criterion storage 211 in FIG. 2 are configured within a mobile station in FIG. 13 (a maximum frequency block count determining section 1301 and a determination criterion storage 1302). The CQI measuring section 302 inputs the CQI to the maximum frequency block count determining section 1301. The maximum frequency block count determining section 1301 looks up the determination criterion storage 1302 to determine a maximum frequency block count specific to the mobile station, and outputs it to the control section 304. It should be noted that a determination criterion table stored in the determination criterion storage 1302 may be factory-supplied, or may be appropriately set at the start of operation or modified during operation.

Description of other portions will be omitted because they are similar to those described regarding the first and second embodiments.

Figure 14:
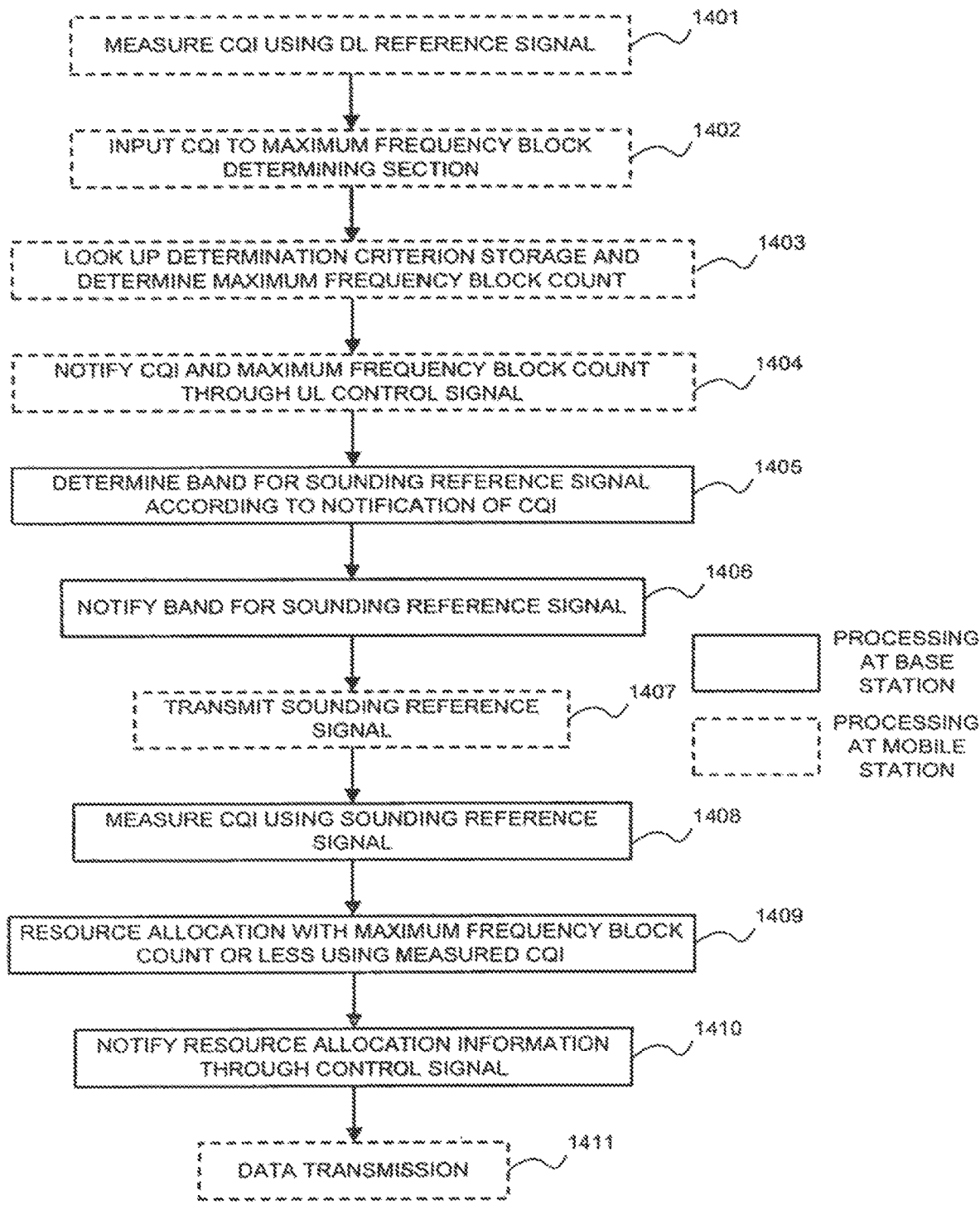
FIG. 14 A chart showing an operation flow of the base station and mobile station in the third embodiment.

FIG. 14 shows an operation flow of the base station and mobile station in the third embodiment. In FIG. 14, steps indicated by solid-line boxes designate an operation of the base station, and those indicated by dotted-line boxes designate an operation of the mobile station.

First, the CQI measuring section 302 in the mobile station measures downlink CQI using a downlink reference signal (Step 1401).

Next, the CQI measuring section 302 inputs the downlink CQI measured at Step 1401 to the maximum frequency block count determining section 1301 (Step 1402).

Next, the maximum frequency block count determining section 1301 looks up the determination criterion storage 1302 to determine a maximum frequency block count according to the downlink CQI (Step 1403).

Next, the CQI measured by the CQI measuring section 302 at Step 1401 and maximum frequency block count determined at Step 1403 are notified to the base station through an uplink control signal (Step 1404).

The scheduler 207 in the base station determines a band for an uplink sounding reference signal based on the downlink CQI notified at Step 1404 (Step 1405), and notifies it to the mobile station via the downlink control signal (Step 1406).

The uplink reference signal generating section 306 in the mobile station transmits a sounding reference signal according to the notification at Step 1406 (Step 1407).

The uplink CQI measuring section 204 in the base station receives the sounding reference signal transmitted at Step 1407 and makes CQI measurement (Step 1408).

Next, the scheduler 207 in the base station makes scheduling so that the frequency block count is equal to or smaller than the maximum frequency block count selected at Step 1403 (Step 1409), and notifies the scheduling information to the mobile station through a downlink control signal (Step 1410). At that time, the downlink control signal generating section 209 generates a resource indication value $RIV_n$ using EQ. (1) given earlier, and notifies it.

Finally, the wireless communication control section 301 in the mobile station transmits uplink data according to the notification at Step 1410 (Step 1411). At that time, it causes a CAZAC sequence matching the transmit bandwidth of all frequency blocks, transforms the sequence into signals in the frequency domain at the DFT section, then, sub-carrier maps a reference signal in the same band as that for transmitting data signals, and transmits the signals. The data signal and reference signal are time division multiplexed (TDM).

While a case in which the maximum frequency block count is determined based on the CQI measured using a downlink reference signal is addressed here, it may be contemplated to use information affecting the communication environment, such as the power headroom, and remaining power of a battery in the mobile station, or information about a communication environment, such as the transmittable/receivable bandwidth of a mobile station (sometimes referred to as UE capability), mobile station class, and type of uplink transmission data (VoIP, HTTP, FTP etc.).

According to the third embodiment, the mobile station can take the initiative to determine the maximum frequency block count. Moreover, since the mobile station determines the maximum frequency block count, the base station need not notify the maximum frequency block count to the mobile station, and an effect of simplifying processing at the mobile station described regarding the first and second embodiments can be expected.

Moreover, the present invention is not limited to application to any specific access scheme such as OFDM or MC-FDMA.

Moreover, while the description has been mainly made on an uplink, the present invention is not limited thereto, and is applicable to a downlink. An operation in this case will now be described with reference to FIG. 24.

First, the CQI measuring section 302 in the mobile station UE uses a downlink reference signal to measure downlink CQI (Step 2401).

Next, the maximum frequency block count determining section 1301 looks up the determination criterion storage 1302 to determine a maximum frequency block count according to the downlink CQI (Step 2402).

Next, the CQI measured by the CQI measuring section 302 at Step 1401 and the maximum frequency block count determined at Step 1403 are notified to the base station through an uplink control signal (Step 2403).

Next, the scheduler 207 in the base station makes scheduling so that the frequency block count is equal to or smaller than the maximum frequency block count determined at Step 2403 (Step 2404).

Finally, the wireless communication control section 201 transmits downlink data based on a result of scheduling at Step 2305 (Step 2405). At that time, it causes a CAZAC sequence matching the transmit bandwidth of all frequency blocks, transforms the sequence into signals in the frequency domain at the DFT section, and then, sub-carrier maps a reference signal in the same band as that for transmitting data signals. The data signal and reference signal are time division multiplexed (TDM).

According to the third embodiment, an appropriate maximum frequency block count is set on a mobile station-by-mobile station basis, whereby further improvement of throughput can be expected independent of an access scheme (OFDM, MC-FDMA, etc.).

Moreover, when switching the maximum frequency block count according to, for example, the CQI, an increase of PAPR can be prevented by reducing the frequency block count in MC-FDMA, and therefore, an additional effect can be expected. In particular, PAPR is problematic in mobile stations having poor CQI, and accordingly, the maximum frequency block count is reduced to avoid an increase of PAPR. On the other hand, in mobile stations in which CQI is acceptable and PAPR is not significantly problematic, the maximum frequency block count may be set to a larger value to aim at improvement of throughput from the multi-diversity effect.

Furthermore, in a case that a frequency block count of one or more is used to perform transmission in MC-FDMA, the property of a CAZAC sequence for use in a reference signal for use in demodulation of PUSCH is prevented from being deteriorated even in transmission using a plurality of frequency blocks by matching the CAZAC sequence for the reference signal to a transmit bandwidth of all frequency blocks. Thus, a PAPR property and channel quality measurement precision equivalent to those for frequency block count=1 can be obtained.

While the description has been made on a case in which the maximum frequency resource block count is determined on a mobile station-by-mobile station basis, mobile stations may be divided into groups based on a certain condition and the maximum frequency resource block count may be determined based on a group to which the own mobile station belongs.

Fourth Embodiment

In the second embodiment described above, the maximum frequency block count is determined by the mobile station based on uplink CQI. According to a fourth embodiment described below, the maximum frequency block count is determined by the base station based on downlink CQI, which is information about a communication environment.

Figure 15:
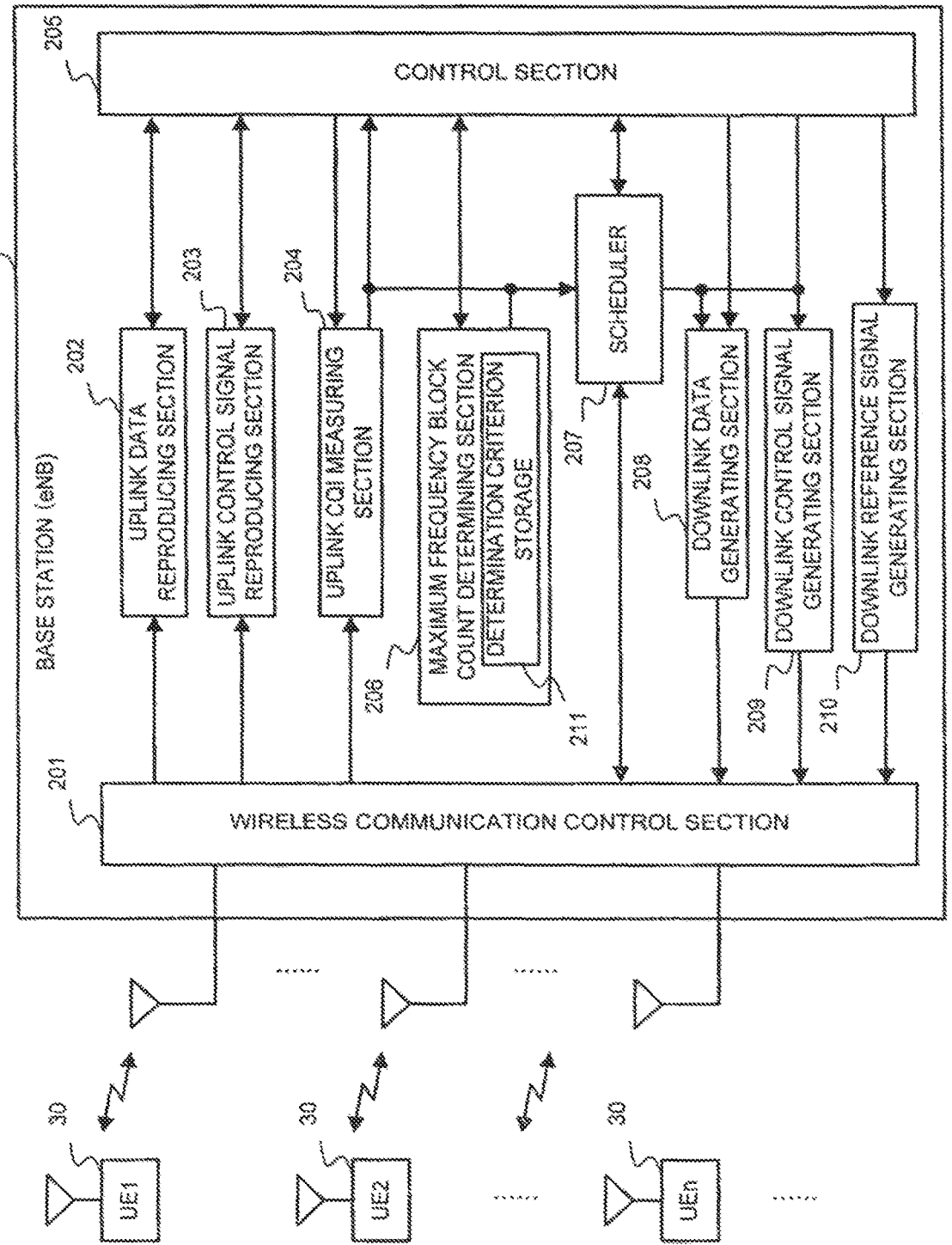
FIG. 15 A block diagram showing a main configuration of a base station in a mobile communications system to which a fourth embodiment is applied.

FIG. 15 is a block diagram showing a main configuration of a base station in a mobile communications system to which the fourth embodiment is applied. Since the configuration is generally similar to that in the second embodiment, differences will be described below.

In the fourth embodiment, the maximum frequency block count is determined by a base station based on downlink CQI, so that the uplink control signal reproducing section inputs the downlink CQI contained in an uplink control signal to the maximum frequency block count determining section. The maximum frequency block count determining section looks up the determination criterion storage to determine a maximum frequency block count specific to the mobile station, and outputs it to the control section. It should be noted that the determination criterion table stored in the determination criterion storage 211 may be factory-supplied, or may be appropriately set at the start of operation or modified during operation.

Since the main configuration of the mobile station UE in the mobile communications system to which the fourth embodiment is applied is similar to that of the first and second embodiments shown in FIG. 3, explanation thereof will be omitted.

Figure 16:
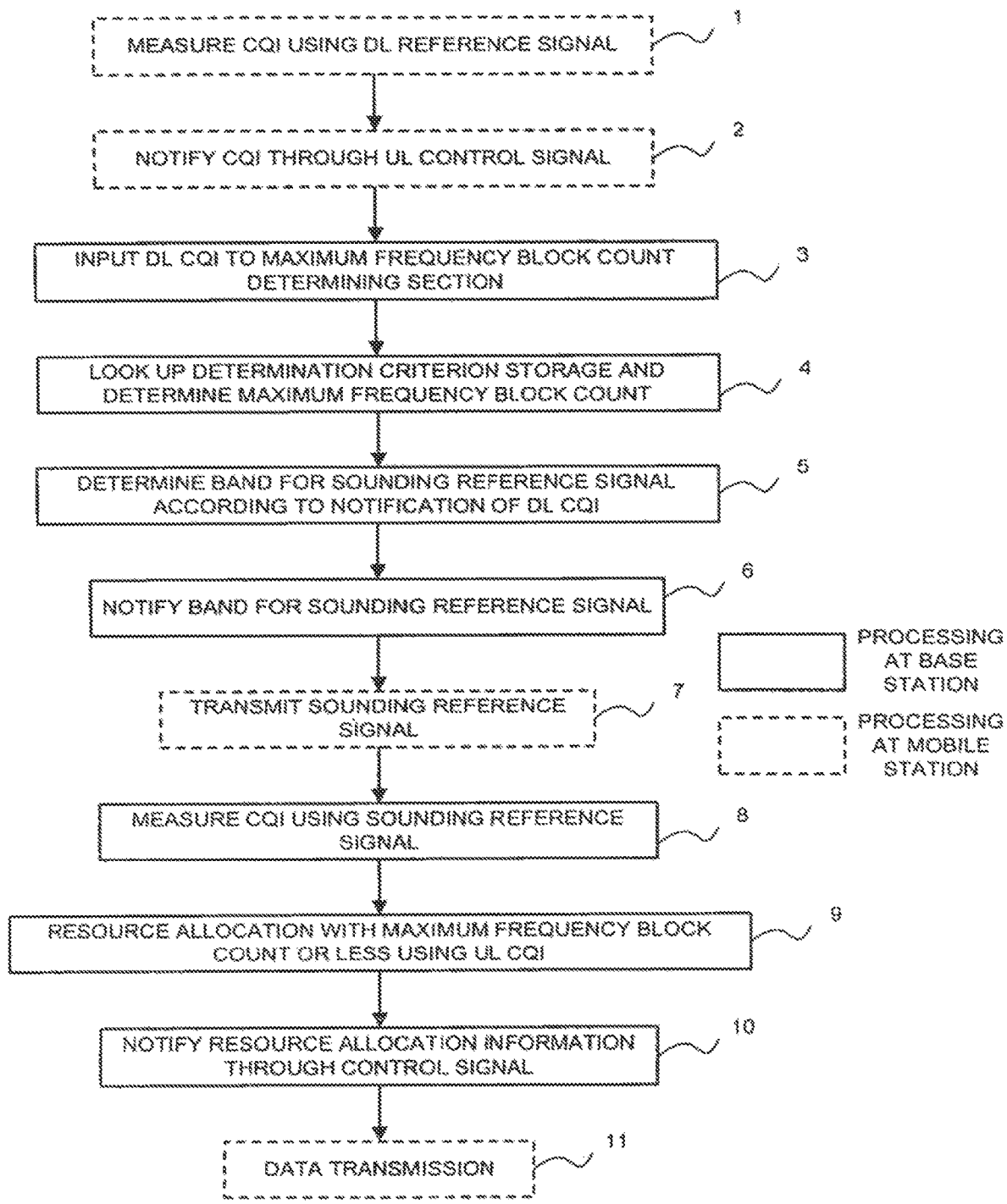
FIG. 16 A chart showing an operation flow of the base station and mobile station in the fourth embodiment.
Figure 17:
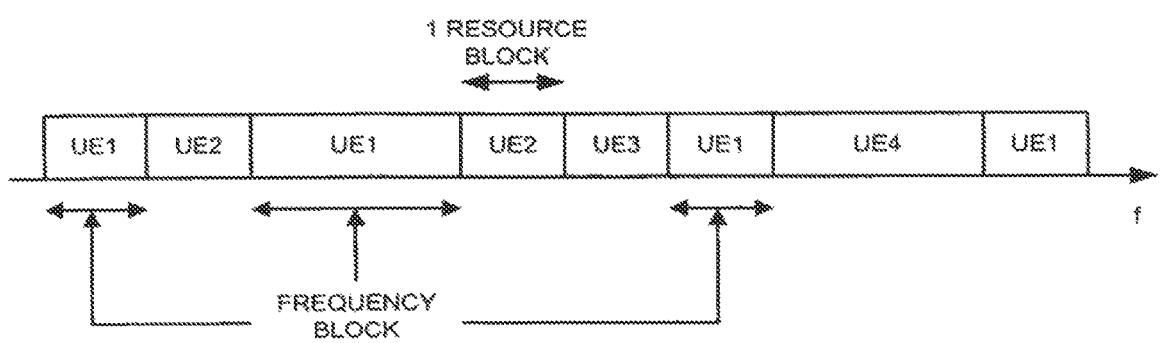
FIG. 17 A diagram showing an example of resource block allocation in an LTE downlink.
Figure 18:
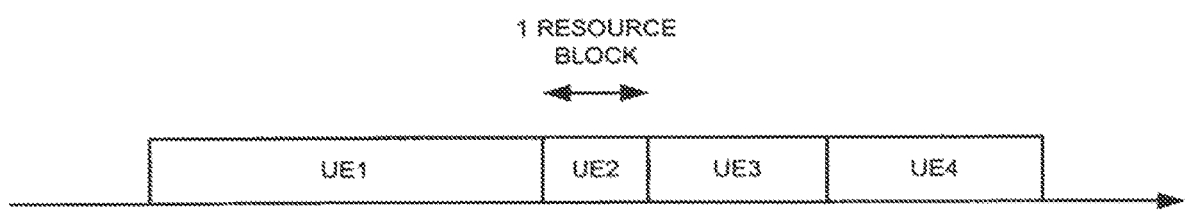
FIG. 18 A diagram showing an example of resource block allocation in an LTE uplink.
Figure 19:
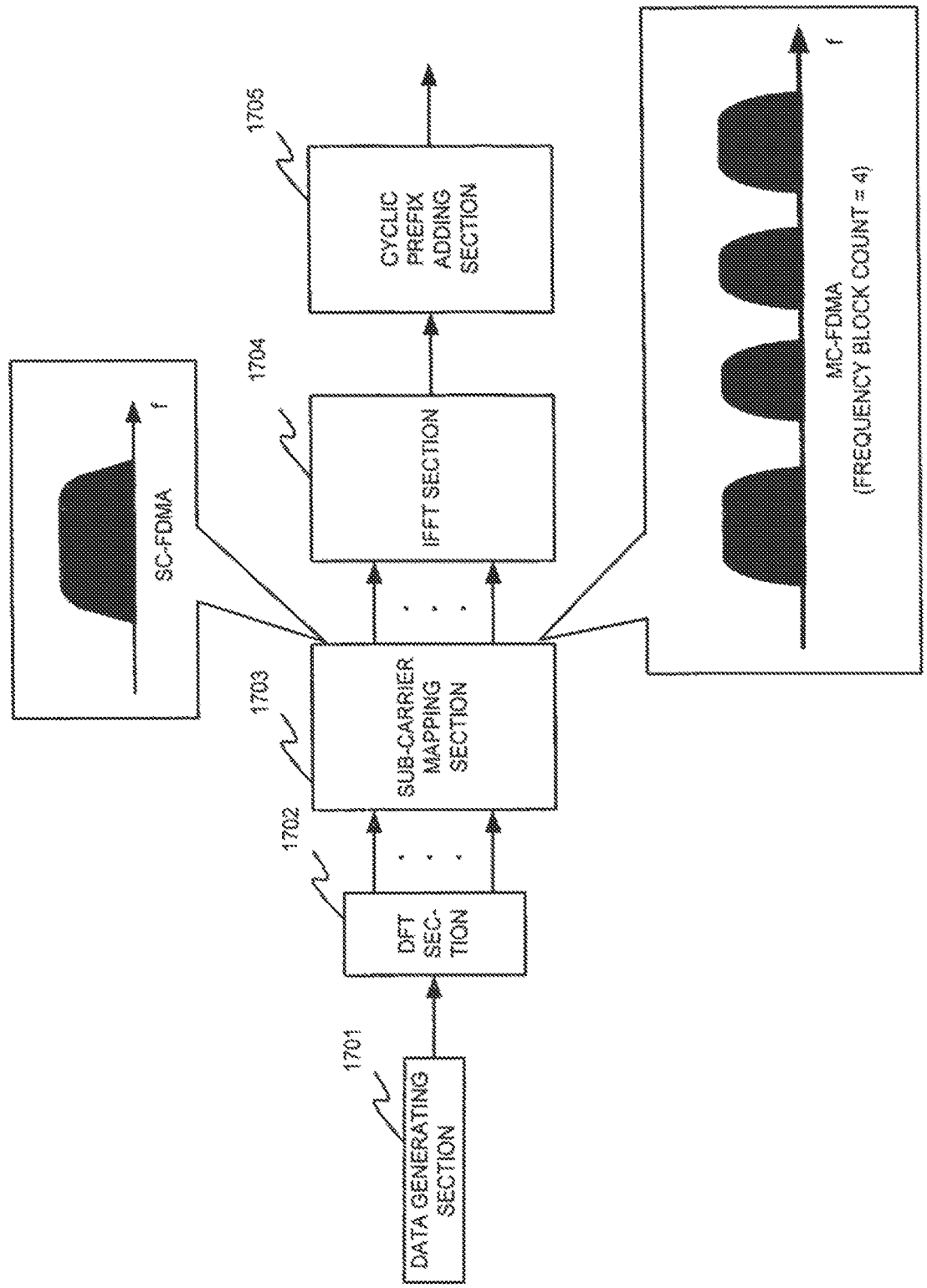
FIG. 19 A diagram showing SC-FDMA and MC-FDMA transmitter configurations, and their spectra.
Figure 20:
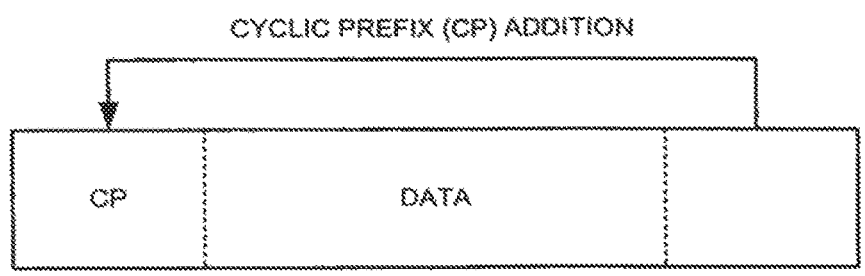
FIG. 20 A diagram for explaining a method of adding a cyclic prefix.
Figure 21:
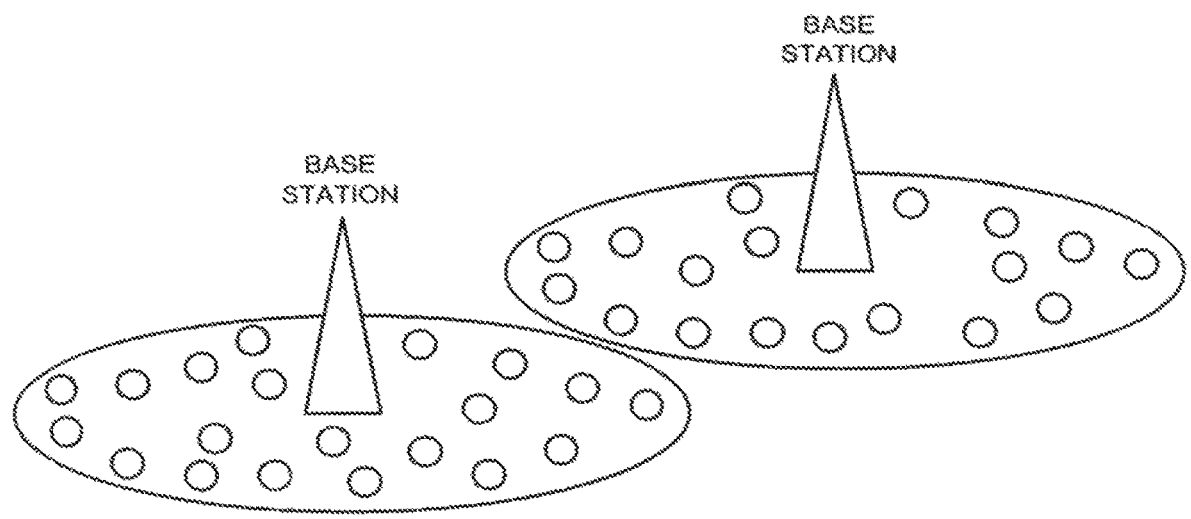
FIG. 21 A system diagram for explaining a system for a technique relating to the present invention.

FIG. 16 shows an operation flow of the base station and mobile station in the fourth embodiment. In FIG. 16, steps indicated by solid-line boxes designate an operation of the base station, and those indicated by dotted-line boxes designate an operation of the mobile station.

First, the CQI measuring section 302 in the mobile station uses a downlink reference signal to measure downlink CQI (Step 1).

Next, an uplink control signal written with the downlink CQI measured at Step 1 is generated at the uplink control signal generating section 307, and is transmitted via the wireless communication control section 301 to thereby notify the downlink CQI to the base station (Step 2). Next, the control section 205 in the base station inputs the downlink CQI to the maximum frequency block count determining section 206 (Step 3). Next, the maximum frequency block count determining section 206 looks up the determination criterion storage 211 to determine a maximum frequency block count according to the downlink CQI (Step 4).

The scheduler 207 in the base station determines a band for an uplink sounding reference signal based on the downlink CQI notified at Step 4 (Step 5), and the downlink control signal generating section 209 generates a downlink control signal written with the band, transmits the generated downlink control signal via the wireless communication control section 301, and thereby notifies it to the mobile station (Step 6).

The mobile station uplink reference signal generating section 306 generates a sounding reference signal according to the notification at Step 6, and transmits it (Step 7).

The uplink CQI measuring section 204 in the base station receives the sounding reference signal transmitted at Step 7, and makes uplink CQI measurement (Step 8).

Next, the uplink CQI measuring section 204 in the base station inputs the uplink CQI measured at Step 8 to the maximum frequency block determining section 206, makes scheduling using the measured uplink CQI so that the frequency block count is equal to or smaller than the maximum frequency block count selected at Step 4 (Step 9), and notifies the scheduling information to the mobile station via the downlink control signal (Step 10). At that time, the downlink control signal generating section 209 generates a resource indication value $RIV_n$ using EQ. (1) given earlier, and notifies it.

Finally, the wireless communication control section 301 in the mobile station transmits uplink data according to the notification at Step 10 (Step 11). At that time, it causes a CAZAC sequence matching the transmit bandwidth of all frequency blocks, transforms the sequence into signals in the frequency domain at the OFT section, then, sub-carrier maps a reference signal in the same band as that for transmitting data signals, and transmits the signals. The data signal and reference signal are time division multiplexed (TDM).

Moreover, the maximum frequency block count ($N_{RIV}$) determined at Step 908 may be notified by the base station to the mobile station at Step 910 through a higher layer control signal mapped to PDSCH. It is believed that uplink scheduling information (UL grant) contained in the downlink control signal becomes larger for a higher frequency block count. In this case, the base station may notify the maximum frequency block count to the mobile station, and determine a range of detection of a downlink control signal based on the maximum frequency block count, whereby a range of the scheduling information looked up by the mobile station can be confined. As a result, processing of detecting a control signal can be reduced.

According to the fourth embodiment, an appropriate maximum frequency block count is set on a mobile station-by-mobile station basis depending upon the environment or condition of communications in the base station or mobile station; whereby further improvement of throughput can be expected independent of an access scheme (OFDM, MC-FDMA, etc.). Moreover, an effect of simplifying processing at the mobile station can be expected by notifying the amount of information on scheduling, which varies with the maximum frequency block count, from the base station to the mobile station.

Moreover, when switching the maximum frequency block count according to, for example, the CQI, an increase of PAPR can be prevented by reducing the frequency block count in MC-FDMA, and therefore, an additional effect can be expected. In particular, PAPR is problematic in mobile stations having poor CQI, and accordingly, the maximum frequency block count is reduced to avoid an increase of PAPR. On the other hand, in mobile stations in which CQI is acceptable and PAPR is not significantly problematic, the maximum frequency block count may be set to a larger value to aim at improvement of throughput from the multi-diversity effect.

Furthermore, in a case that a frequency block count of one or more is used to perform transmission in MC-FDMA, the property of a CAZAC sequence for use in a reference signal for use in demodulation of PUSCH is prevented from being deteriorated even in transmission using a plurality of frequency blocks by matching the CAZAC sequence for the reference signal to a transmit bandwidth of all frequency blocks. Thus, a PAPR property and channel quality measurement precision equivalent to those for frequency block count=1 can be obtained.

While in the embodiments described above, a mode of allocating uplink resource blocks and a mode of allocating downlink resource blocks have been individually described, a mode in which the mode of allocating uplink resource blocks is combined with the mode of allocating downlink resource blocks may be implemented.

Moreover, as obvious from the preceding description, while the mobile station and base station in the present invention described above can be implemented in hardware, it is possible to implement them by computer programs.

Functions and operations similar to those in the embodiments described above are implemented by a processor running under programs stored in a program memory. It should be noted that part of functions in the embodiments described above may be implemented by computer programs.

The present invention is applicable generally to mobile wireless systems that perform resource block allocation.

The present application claims priority based on Japanese Patent Application No. 2008-072581 filed on Mar. 19, 2008, disclosure of which is incorporated herein in its entirety.

The invention claimed is:

1. A communication method for a user equipment (UE), the communication method comprising:
   transmitting, to a base station, first information indicating that the UE supports Physical Uplink Shared Channel (PUSCH) transmission using two sets,
      wherein the two sets are located on a frequency axis non-consecutively, and
      wherein each of the two sets includes one or more consecutive resource blocks; and
   receiving, from the base station, second information the two sets which are allocated to the UE for the PUSCH transmission,
      wherein the second information depends on the first information, and
      wherein a sequence length of a demodulation reference signal for use in demodulation of PUSCH matches a number of subcarriers of the two sets.

2. The communication method according to claim 1, wherein the sequence length is equal to the number of the subcarriers of the two sets.

3. A communication method for a base station, the communication method comprising:
   receiving, from a user equipment (UE), first information indicating that the UE supports Physical Uplink Shared Channel (PUSCH) transmission using two sets,
      wherein the two sets are located on a frequency axis non-consecutively, and
      wherein each of the two sets includes one or more consecutive resource blocks; and
   transmitting, to the UE, second information indicating the two sets which are allocated to the UE for the PUSCH transmission,
      wherein the second information depends on the first information, and
      wherein a sequence length of a demodulation reference signal for use in demodulation of PUSCH matches a number of subcarriers of the two sets.

4. The communication method according to claim 3, wherein the sequence length is equal to the number of the subcarriers of the two sets.

5. The communication method according to claim 3, further comprising:

scheduling the second information for scheduling to respect the first information.

6. A user equipment (UE) comprising:
a memory storing instructions; and
at least one hardware processor configured to process the instructions to:
  transmit, to a base station, first information indicating that the UE supports Physical Uplink Shared Channel (PUSCH) transmission using two sets,
    wherein the two sets are located on a frequency axis non-consecutively, and
    wherein each of the two sets includes one or more consecutive resource blocks; and
  receive, from the base station, second information indicating the two sets which are allocated to the UE for the PUSCH transmission,
    wherein the second information depends on the first information, and
    wherein a sequence length of a demodulation reference signal for use in demodulation of PUSCH matches a number of subcarriers of the two sets.

7. The UE according to claim 6, wherein the sequence length is equal to the number of the subcarriers of the two sets.

8. A base station comprising:
a memory storing instructions; and
at least one hardware processor configured to process the instructions to:
  receive, from a user equipment (UE), first information indicating that the UE supports Physical Uplink Shared Channel (PUSCH) transmission using two sets,
    wherein the two sets are located on a frequency axis non-consecutively, and
    wherein each of the two sets includes one or more consecutive resource blocks; and
  transmit, to the UE, second information indicating the two sets which are allocated to the UE for the PUSCH transmission,
    wherein the second information depends on the first information, and
    wherein a sequence length of a demodulation reference signal for use in demodulation of PUSCH matches a number of subcarriers of the two sets.

9. The base station according to claim 8, wherein the sequence length is equal to the number of the subcarriers of the two sets.

10. The base station according to claim 8, wherein the at least one hardware processor is configured to process the instructions to schedule the second information for scheduling to respect the first information.

11. The communication method according to claim 1, wherein the two sets consist of the subcarriers.

12. The communication method according to claim 3, wherein the two sets consist of the subcarriers.

13. The UE according to claim 6, wherein the two sets consist of the subcarriers.

14. The base station according to claim 8, wherein the two sets consist of the subcarriers.

15. The communication method according to claim 1, wherein the demodulation reference signal is transmitted to the base station.

16. The communication method according to claim 3, wherein the demodulation reference signal is received from the UE.

17. The UE according to claim 6, wherein the demodulation reference signal is transmitted to the base station.

18. The base station according to claim 8, wherein the demodulation reference signal is received from the UE.

* * * * *

UNITED STATES PATENT AND TRADEMARK OFFICE
CERTIFICATE OF CORRECTION

| | | |
|---|---|---|
| PATENT NO. | : 12,041,593 B2 | Page 1 of 1 |
| APPLICATION NO. | : 18/100899 | |
| DATED | : July 16, 2024 | |
| INVENTOR(S) | : Takamichi Inoue et al. | |

It is certified that error appears in the above-identified patent and that said Letters Patent is hereby corrected as shown below:

In the Claims

Column 20, Line 35; In Claim 1, after "information", insert --indicating--

Signed and Sealed this
Ninth Day of September, 2025

Coke Morgan Stewart
*Acting Director of the United States Patent and Trademark Office*